United States Patent [19]
Hatamura

[11] Patent Number: 5,644,951
[45] Date of Patent: Jul. 8, 1997

[54] FEED SCREW APPARATUS AND PRECISE POSITIONING AND FINE FEED SYSTEM

[76] Inventor: Yotaro Hatamura, 12-11, Kobinata 2-chome, Bunkyo-ku, Tokyo, 112, Japan

[21] Appl. No.: 87,699

[22] PCT Filed: Nov. 13, 1992

[86] PCT No.: PCT/JP92/01490

§ 371 Date: Dec. 28, 1994

§ 102(e) Date: Dec. 28, 1994

[87] PCT Pub. No.: WO93/09911

PCT Pub. Date: May 27, 1993

[30] Foreign Application Priority Data

| Nov. 15, 1991 | [JP] | Japan | 3-327017 |
| Nov. 18, 1991 | [JP] | Japan | 3-328335 |
| Nov. 20, 1991 | [JP] | Japan | 3-332571 |

[51] Int. Cl.$^6$ ................................. F16H 25/22
[52] U.S. Cl. .................. 74/89.15; 74/424.8 R; 74/441
[58] Field of Search .............. 74/89.15, 424.8 R, 74/409, 440, 441

[56] References Cited

U.S. PATENT DOCUMENTS

| 2,643,845 | 6/1953 | Baker | 74/441 |
| 3,720,116 | 3/1973 | Better et al. | 74/441 |
| 4,487,087 | 12/1984 | Johnstone | 74/441 |
| 5,129,279 | 7/1992 | Rennex | 74/479 |
| 5,263,381 | 11/1993 | Shirai | 74/441 |

FOREIGN PATENT DOCUMENTS

| 4015196A1 | 11/1990 | Germany. |
| 42-2233 | 2/1942 | Japan. |
| 47-35461 | 11/1972 | Japan. |
| 60-213456 | 10/1985 | Japan. |
| 60-259347 | 12/1985 | Japan. |
| 61-5551 | 1/1986 | Japan. |
| 61-62110 | 3/1986 | Japan. |
| 61-214941 | 9/1986 | Japan. |
| 62-4540 | 1/1987 | Japan. |
| 62-147161 | 7/1987 | Japan. |
| 63-500362 | 2/1988 | Japan. |
| 63-95383 | 4/1988 | Japan. |
| 63-123648 | 5/1988 | Japan. |
| 63-144929 | 6/1988 | Japan. |
| 63-144930 | 6/1988 | Japan. |
| 64-34632 | 2/1989 | Japan. |
| 1-177938 | 7/1989 | Japan. |
| 2-65940 | 3/1990 | Japan. |
| 2-221747 | 9/1990 | Japan. |

*Primary Examiner*—Charles A. Marmor
*Assistant Examiner*—David Fenstermacher
*Attorney, Agent, or Firm*—Armstrong, Westerman, Hattori, McLeland & Naughton

[57] ABSTRACT

A feed screw apparatus comprises a fixed member, a feed screw shaft rotatably supported to the fixed member, a nut mounted to the feed screw shaft and a movable member attached to the nut, wherein a force is transferred from the fixed member through the feed screw shaft and the nut, and the device comprises an elastic member elastically deformable in the axial direction and provided with a portion through which a force is transferred. A force can be detected by an elastically deformed amount of the elastic member. Further, an axially expandable and contractable portion is formed by arranging a displacement generator in parallel with the elastic member, and by elastically deforming the elastic member, the precise and fine displacement can be generated. Furthermore, a preload to be applied to balls of the nut is made adjustable by utilizing the axially expandable and contractable portion.

41 Claims, 32 Drawing Sheets

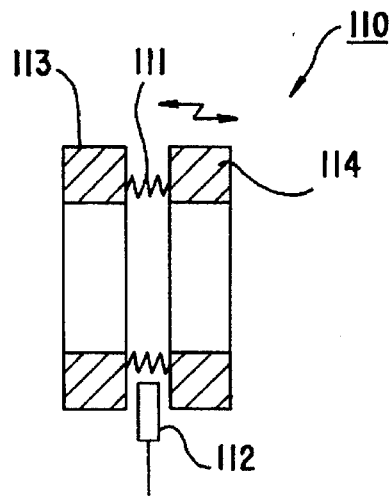
Fig.8
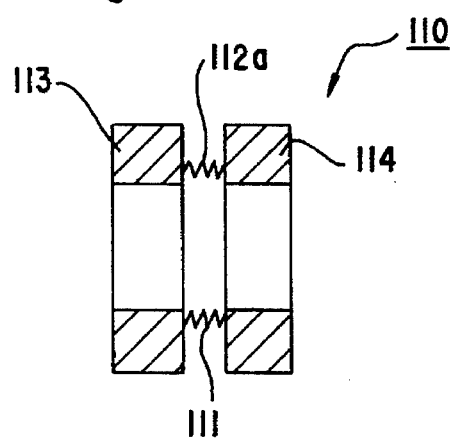
Fig.9(a)
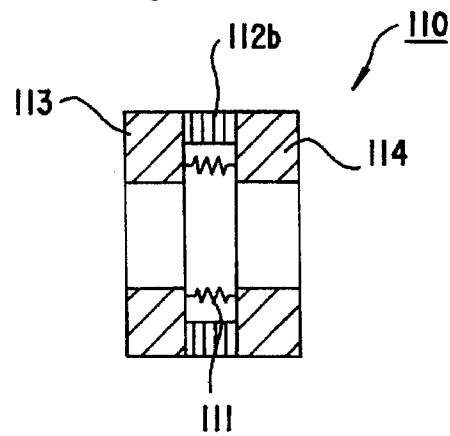
Fig.9(b)
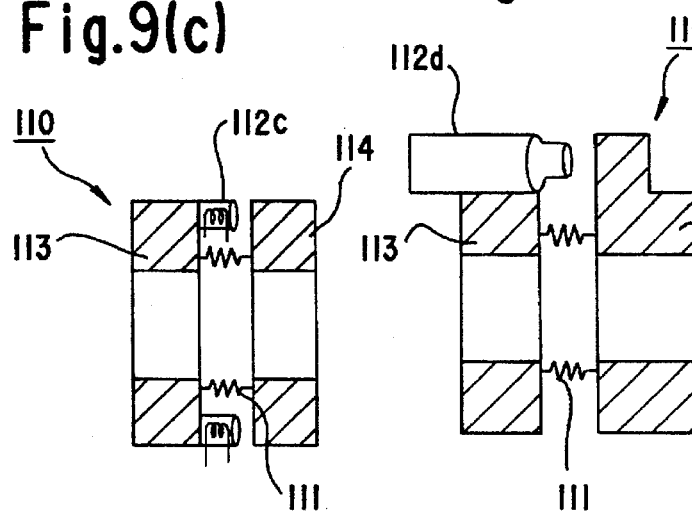
Fig.9(c)
Fig.9(d)
Fig.9(e)

Fig.10(a)
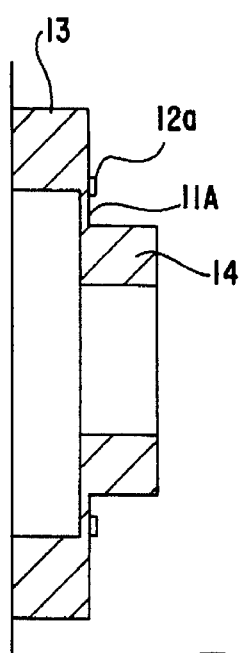
Fig.10(b)
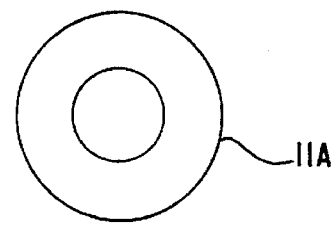
Fig.10(c)
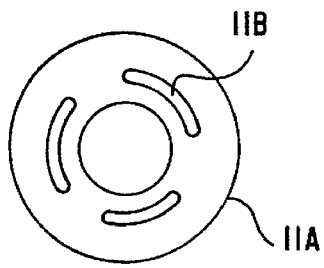
Fig.10(d)
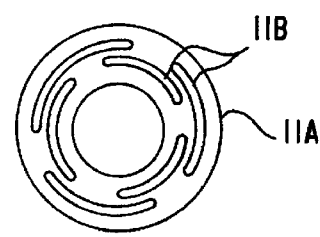
Fig.10(e)
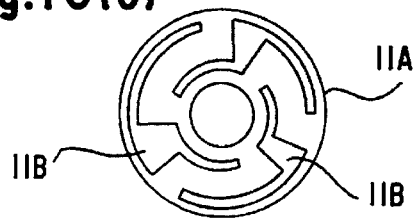
Fig.10(f)
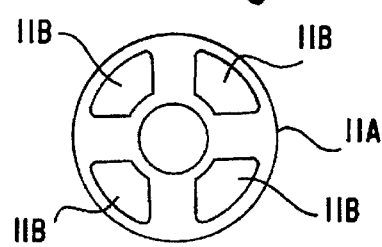
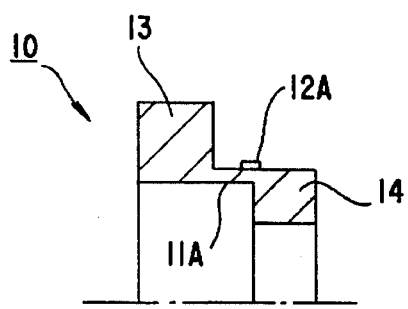
Fig.10(g)
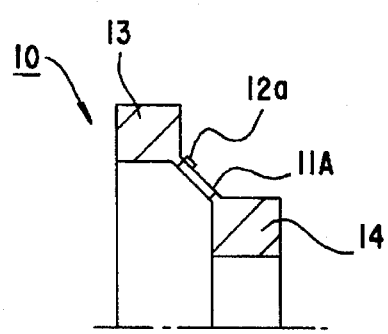
Fig.10(h)

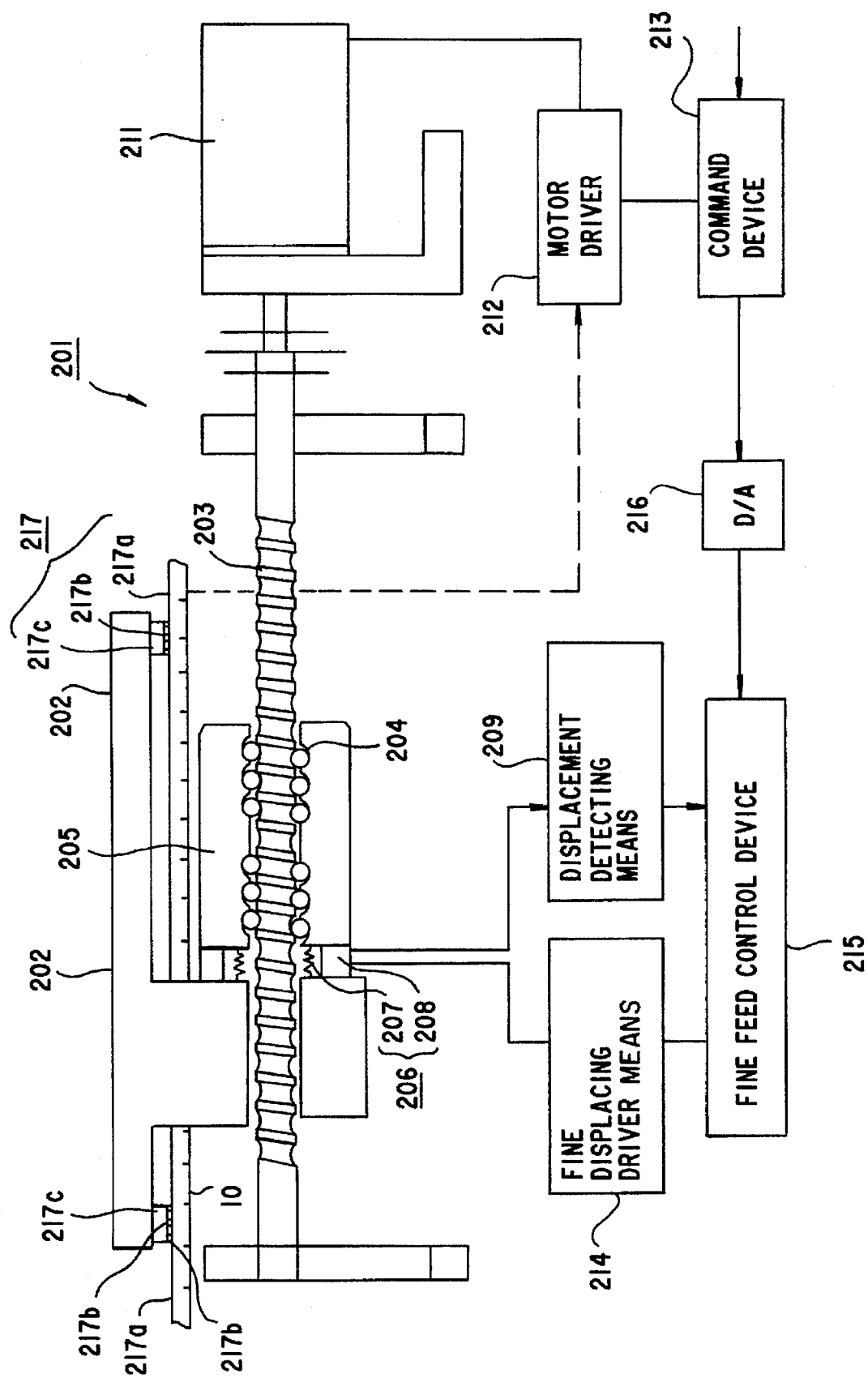

Fig.18(a)
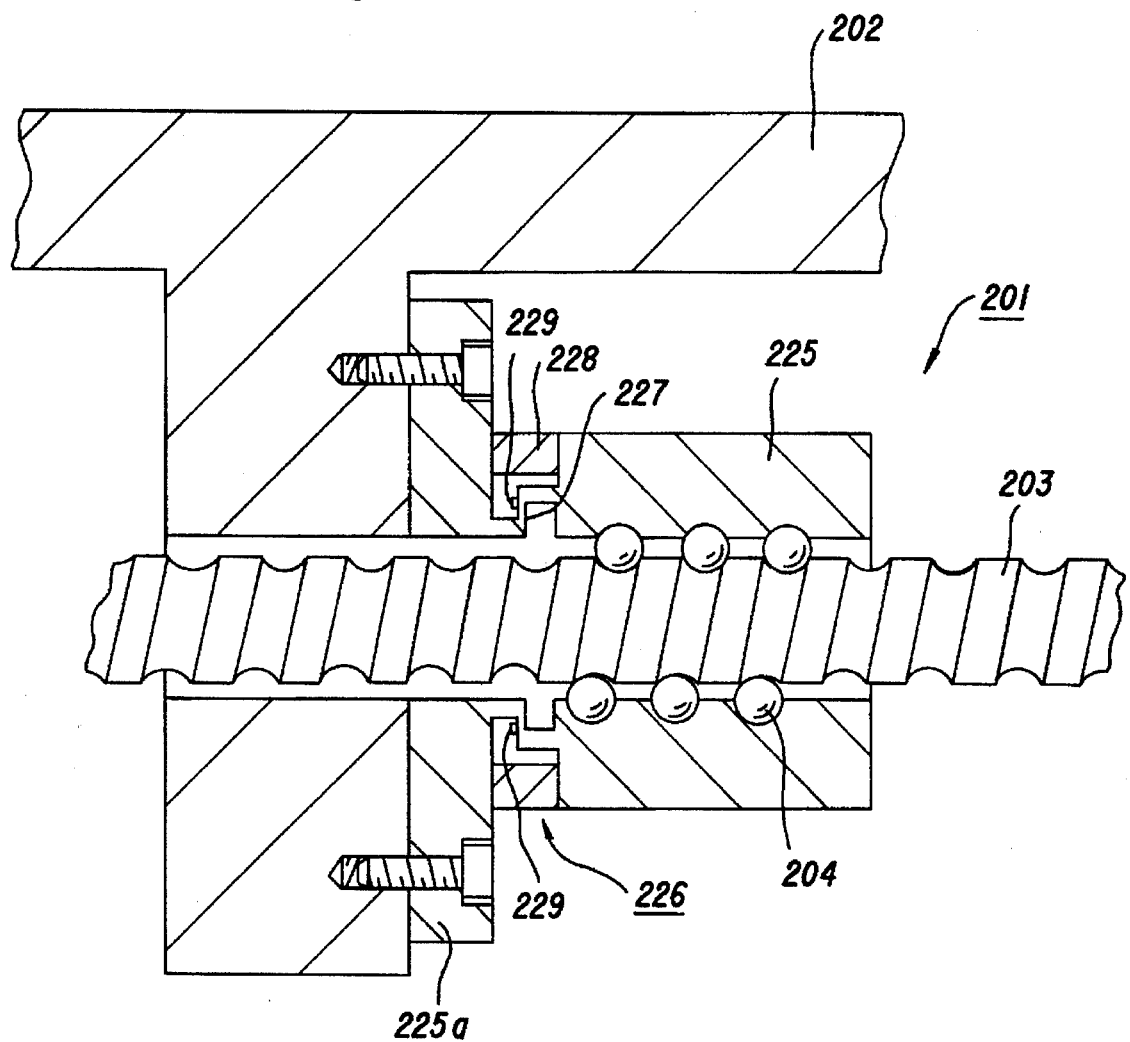
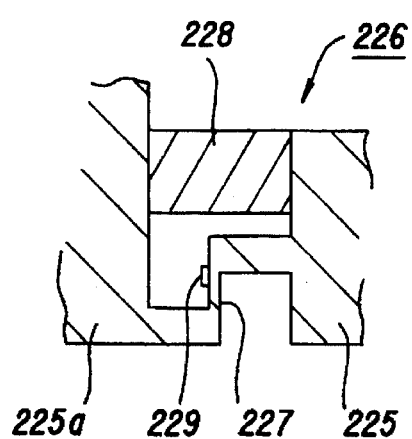
Fig.18(b)
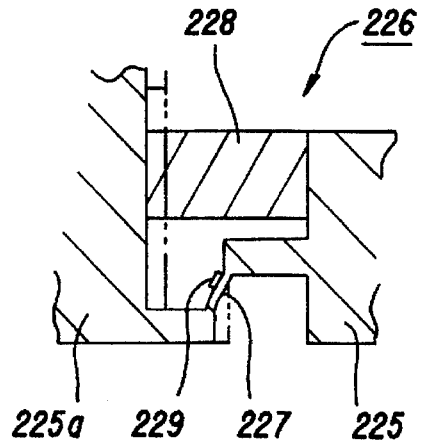
Fig.18(c)

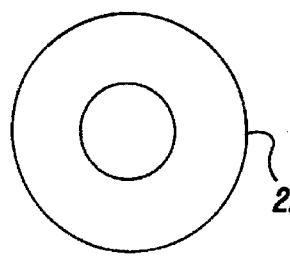
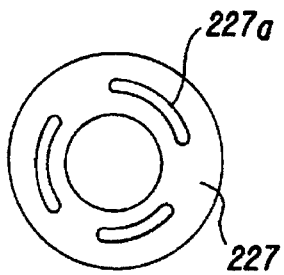
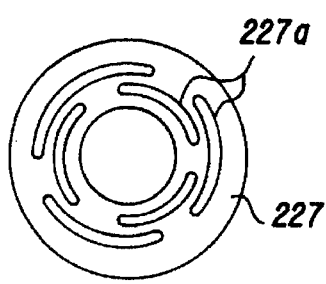
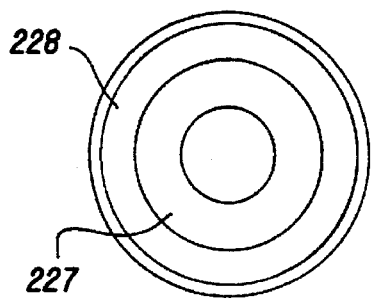
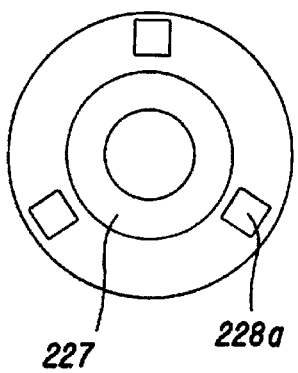
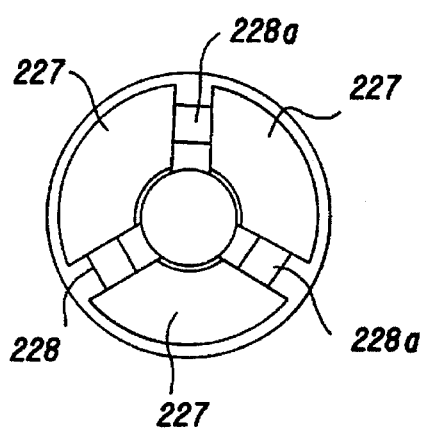
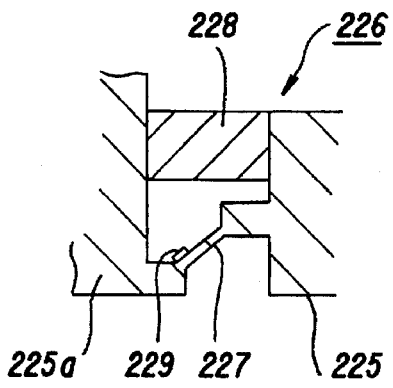
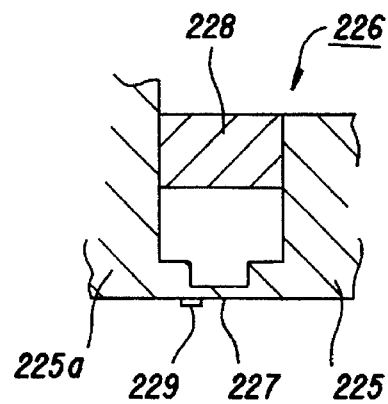

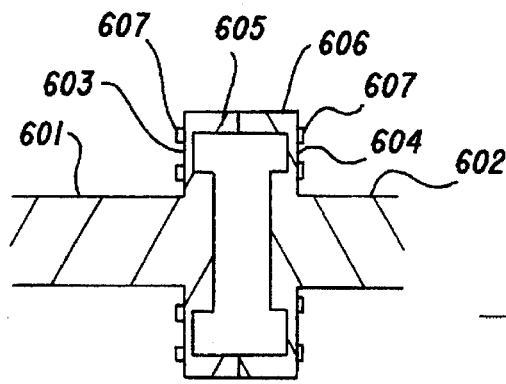
Fig.41(a)
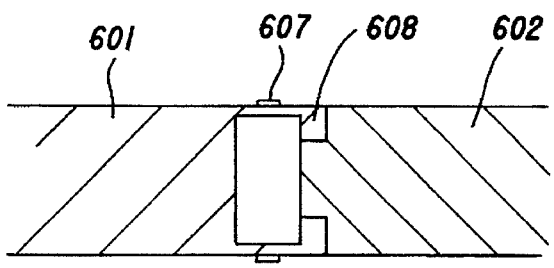
Fig.41(b)
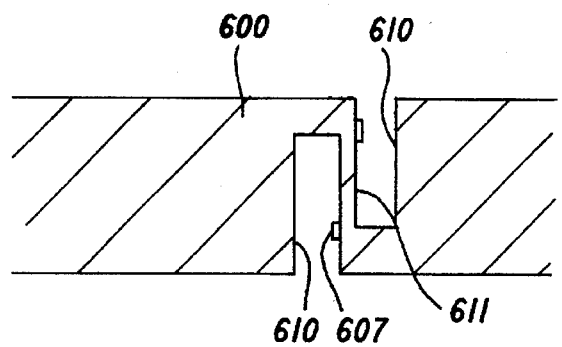
Fig.41(c)
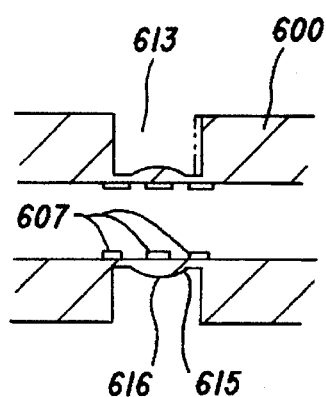
Fig.41(f)
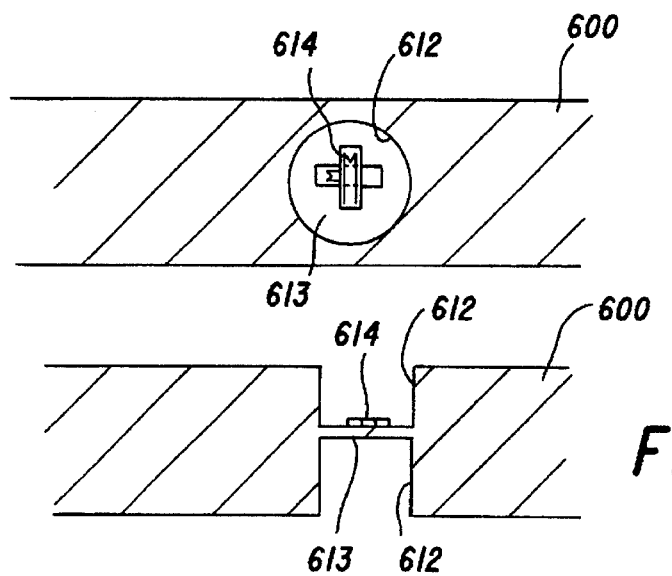
Fig.41(d)
Fig.41(e)

FEED SCREW APPARATUS AND PRECISE POSITIONING AND FINE FEED SYSTEM

TECHNICAL FIELD

This invention relates to a feed screw aparatus, and a precise positioning and fine feed system widely utilized for apparatus for which fine feeding and positioning are required such as, for example, machine tools, robots, measuring devices and the like.

Recently, as represented in semiconductor technology, it has been required to carry out fine working with high performance, and in accordance with the development of numerical control (NC) technology, the working precision or performance has been remarkably developed through positioning control technology. In order to carry out such positioning control with high precision, in a conventional technique, many power has been shared to increase rigidity of a machine tool.

For example, with respect to a feed screw apparatus used for a linear guide unit of a machine tool, the rigidity is increased by applying a suitable preload to balls disposed between a nut and a feed screw shaft to make zero the gap in the axial direction and to make small an elastic deformation with respect to the axial load, thereby improving the positioning precision.

However, the increasing of the rigidity of the machine tool itself has its limit, and it has become difficult to obtain the working precision required for fine working in these days.

In the meantime, in a machine working, it is necessary to detect a deformed amount of a machine, a tool and a work by measuring a power, to thereby detect a working precision of the work and an abnormality thereof, to consider a disturbance, to avoid an excessive power to be applied to the work or tool and also to consider the working efficiency. The working condition or state can be surely established by monitoring the power.

In these days having improved in automation technology, although unmanned operation and labor saving operation has considerably progressed, there is a rare case where completely unmanned opertion has been actually realized for 24 hours.

This is based on the fact that, in an actual working, when an unexpected breaking of the tool is caused or a set condition is changed due to an environmental change, there is no effective means for detecting these abnormal conditions. Furthermore, a technique for judging the power applied to the tool during the working through the experience of an expert and finely and for safely adjusting the work to carry out the precise working has not been provided for a feed screw apparatus utilized for an existing machine tool.

In this point of view, there has been required the necessity for detecting the force being an important factor for the working lacking for the conventional postioning control and for controlling the machine tool through the feedback of information on the power, and hence, it is required to develop the feed screw apparatus combined with an axial tension detecting sensor for precisely detecting the axial tension. Further, in the conventional technology, a feed screw apparatus having high density and high precision has been required in industrial fields of semiconductors and bio-technology, but the requirement of the high precision such as of micron unit has been raised to the working of general machine tools.

Ball screw devices have been widely utilized for conventional feed screw apparatus performing the precise positioning operation. Namely, a screw shaft is driven to rotate by means of a pulse motor to thereby linearly move a nut screwed with the screw shaft, and accordingly, feeding of a table attached by the nut can be controlled.

However, a resolving power of the conventional ball screw device depends on a lead of the screw shaft and a resolving power (pulse number/revolution number) of a motor rotating the screw shaft, and in order to increase the resolving power of the feed device, it becomes necessary to utilize a ball screw with small lead and a motor having a high resolving power.

However, influence on working error becomes large by reducing the lead of the screw shaft, and accordingly, it is difficult to reduce the lead of the screw shaft. Moreover, in order to achieve the high resolving power of the motor, it is required to make a highly precise encoder as well as to achieve a high resolving power. However, in order to make the highly precise encoder and to achieve the high resolving power, it is necessary to cut slits of the encoder mechanically finely, thus being limited in the working performance.

Further, in order to increase the resolving power, there may be provided a micro-step method in which driving is controlled by utilizing a harmonic gear or electrically finely sectioning a control current, but in this method, the resolving power has a limit up to a micron or submicron unit.

Furthermore, in order to electrically obtain the high resolving power, there is a problem of location of a command device of high transmission frequency.

There is known a feed device utilizing a fine displacing means such as a piezoelectric element or an electrostrictive element to carry out the positioning with a nanometer unit, but since the maximum displacement width of the piezoelectric element or the like is very small, a stroke of such means is made extremely short, providing a big problem.

Then, in order to elongate the stroke of the fine displacing means, a mechanism, so-called an inch-worm mechanism, has been deviced, and as shown in FIG. 40(a), there is provided a device in which a finely movable table 1101 utilizing such type of an inch-worm mechanism 1100 is assembled on a roughly movable table 1103 utilizing a ball screw device 1102 to thereby carry out a rough positioning by the ball screw device 1102 and a fine positioning by the inch-worm mechanism 1100.

The inch-worm mechanism 1100 is composed of, as shown in FIG. 40(b), first, second and third piezoelectric cylinders 1105, 1106 and 1107 mounted to a shaft 1104. According to this structure, a voltage is applied to the first piezoelectric cylinder 1105 to clamp the shaft 1104 and, under this condition, the second piezoelectric cylinder 1106 is elongated to thereby feed the third piezoelectric cylinder 1107 rightward as viewed by a predetermined length. In the next step, the first piezoelectric cylinder 1105 is made free to release the clamping force, a predetermined voltage is applied to the third piezoelectric cylinder 1107 to clamp the shaft 1104, and then, the second piezoelectric cylinder 1106 is contracted to thereby feed the first piezoelectric cylinder 1105 rightward as viewed. As mentioned above, the inch-worm mechanism 1100 is linearly moved by repeating these operations of the first, second and third piezoelectric cylinders 1105, 1106 and 1107, respectively.

However, in the feed apparatus of this structure, since the finely movable table 1101 of the inch-worm mechanism 1100 is mounted on the roughly movable table 1103 using the ball screw device 1102, it is difficult to assemble the finely and roughly movable tables 1101 and 1103.

Further, since the finely movable table 1101 of the inch-worm mechanism 1100 is mounted on the roughly movable table 1103 of the ball screw device 1102, the height of the entire assembly is made high and the structure thereof is hence not made compact. These problems constitute fatal defects for the construction of a multi-spindle table.

Furthermore, since the axial position of the finely movable table 1101 of the inch-worm mechanism 1100 is supported by the clamping action of the first and third piezoelectric cylinders 1105 and 1107, it is difficult to support the axial load, and since the total height of the structure is made high, good supporting ability is not obtained, thus constituting a problem.

Concerning the precise positioning, in the conventional feed apparatus, there is a problem of causing minute vibration at the positioning time. This is a phenomenon that the minute vibration is caused to the table by an inertia force at the time of high speed positioning. When such minute vibration is caused, it requires much time to complete the positioning of the table and response characteristic is hence made worse.

Still furthermore, in the conventional technology, when the positioning is performed with high precision by the feed screw apparatus, a preload is applied to the feed screw apparatus to thereby make substantially zero the axial gap and an elastic displacement with respect to the axial load is made small by increasing the rigidity.

As a method of applying such preload, there is provided a method in which a washer is inserted between two nuts screwed with a screw shaft to thereby apply the preload therebetween.

However, in the feed screw apparatus which applies the preload by utilizing the washer, a condition of the preload is changed by such problems as wearing of screws or the like, working error of the lead of the screw or temperature change.

Then, there has been proposed a feed screw apparatus capable of adjusting the preload by changing the gap between the nuts by expanding and contracting the washer in the axial direction, for example, as disclosed in the Japanese Patent Laid-open (KOKAI) Publication No. 61-65958.

This feed screw apparatus has been proposed in the view point of the fact that a change of torque is caused to the screw shaft by the change of the condition of the preload, and in this feed screw apparatus, the torque acting on the screw shaft is detected and the preload is adjusted by expanding or contracting the washer by a predetermined amount to thereby obtain a desired torque.

Further, excepting the above, there has been proposed a method of adjusting the preload by expanding or contracting the washer in response to a revolution number of the feed screw apparatus in the view point of a fact that a starting torque of the initial rotation of the feed screw apparatus is high in comparison with a steady torque (refer to the Japanese Patent Laid-open (KOKAI) Publication No. 64-64 747).

However, in the conventional preload applying method utilizing the washer, when both nuts are relatively rotated, the preload changes, so that it is necessary to provide a rotation preventing means for limiting the relative rotation while allowing the relative displacement in the axial direction of the screw shafts of both the nuts. The conventional rotation preventing means are as follows.

① The relative rotation is prevented by fitting a parallel key into axial key grooves formed on outer surfaces of both nuts.

② The relative rotation is prevented by forming the outer configuration of each of both nuts so as to have a cross sectional shape other than circular shape, preparing sleeves having shapes corresponding to the respective nuts and, after mounting these sleeves to the nuts, fixing the sleeves to one of the nuts.

However, in these rotation preventing means utilizing the keys or sleeves, the keys or sleeves are fitted between the nuts so as not to cause backlash, frictional resistance is made large and an insensitive zone, in which the nuts do not start to move till the time when a force more than the frictional resistance at the time of the adjustment of the thickness of the washer, is caused, which may result in a decreased sensitivity to the preload adjustment and the operational fault, thus providing a problem.

Further, the conventional preload applying methods utilizing the washer do not directly detect the preload condition of the feed screw shaft and the preload condition is indirectly assumed from the change of the torque, so that the preload condition cannot be exactly grasped.

Because of this reason, even if the washer is expanded or contracted in the axial direction to adjust the preload, it is not clear whether the washer actually exactly acts or not, and moreover, since the changed preload amount cannot be exactly detected, the preload cannot be acurately controlled.

This invention was conceived to solve the above problems encountered in the prior art and aims to provide a feed screw apparatus capable of, by arranging an elastic member to a portion at which a force of the feed screw apparatus is transferred, keeping the transferred force to a predetermined magnitude, detecting a force obtained from a deformed amount of the elastic member and generating a displacement, reversely, by applying a force.

Consequently, the object is to provide a feed screw apparatus capable of keeping the force caused inside a machine and the force applied externally to a predetermined value and detecting the axial force or tension with high precision to thereby monitor the information of the force.

A further object is further to realize a feed screw apparatus and system capable of performing precise positioning and fine feed with extremely precise resolving power and with a large stroke even in a compact structure.

Furthermore, an object is to provide a feed screw apparatus and system capable of performing precise positioning and fine feed and capable of solving the minute vibration problem and then making remarkably short the positioning completion time.

Still furthermore, an object is to provide a feed screw apparatus capable of achiving high sensitiveness to the preload adjustment and making stable the operation.

Still furthermore, an object is to provide a feed screw apparatus capable of directly detecting an actual preload condition to thereby control the preload more precisely.

DISCLOSURE OF THE INVENTION

In order to achieve the above objects, according to this invention, there is provided a feed screw apparatus comprising a fixed member, a feed screw shaft supported to the fixed member to be rotatable, a nut mounted to the feed screw shaft and a member to be fed attached to the nut and wherein a force is transferred to the member to be fed from the fixed member through the feed screw shaft and the nut, the apparatus being characterized in that an elastic member elastically deformable in an axial direction is provided at a portion through which the force is transferred.

According to this structure, the elastic member is deformed in accordance with the magnitude of the force when acting and a force generated inside a machine or a force applied externally can be adjusted so as to have a predetermined magnitude, and moreover, the magnitude of the force can be recognized from the elastically deformed amount. Furthermore, a displacement can be caused by applying a force to the elastic member.

It is characterized that the elastic member is elastically deformable in the axial direction and rigid in a rotating direction and in a direction perpendicular to the feed screw shaft.

It is characterized that the elastic member is formed with a thin thickness portion elastically deformable in the axial direction It is characterized that the elastic member is formed with a portion of a structure through which the force of the feed screw apparatus is transferred as an integral structure so as to provide an elastically deformable portion in the axial direction.

It is characterized that the elastic member is formed as an independent structure from the structure through which the force of the feed screw apparatus is transferred and joined thereto.

It is characterized that the elastic member is provided between the fixed member, the feed screw shaft, the nut and the member to be fed.

It is characterized that a force detecting means for detecting the force through detection of an amount of an elastic deformation of the elastic member is disposed.

It is characterized that the axial tension detecting means includes the elastic member and a displacement or strain detecting means for converting a displacement, force or strain variable in accordance with an axial load of the elastic member into an electric signal and detecting the signal.

It may be possible that the axial tension detecting means is disposed between the nut and the member to be fed, or provided for a washer for applying a preload disposed between nut portions in a case where the nut is divided into two nut portions and the washer is interposed therebetween, or provided for the feed screw shaft, or provided for a bearing portion of the fixed member of the feed screw shaft.

It is preferred that the elastic member is elastically deformable in the axial direction and rigid in the rotating direction and in the direction perpendicular to the shaft and is provided with a thin thickness portion axially deformable.

It is further preferred that a strain gauge is bonded to the thin thickness portion.

According to the feed screw apparatus having the force detecting means of the structure described above, the variation or change of the axial tension actually acting on the feed screw apparatus can be directly detected by the axial tension detecting means provided at a force acting portion between the nut and the member to be fed.

Furthermore, the axial tension can be exactly detected by detecting the displacement or strain of the elastic member elastically deformable in response to the change of the axial tension.

Still furthermore, the elastic member can function as a rotation preventing means by constructing the elastic member to be elastically deformable in the axial direction and rigid in the rotating direction.

The axial tension can be sensitively detected by bonding the strain gauge to the thin thickness portion.

Furthermore, it is characterized that the displacement generating means is arranged in parallel to the elastic member to form an axially expandable and contractable portion for deforming the elastic member axially.

It is characterized that a rough feed of the member to be fed is performed by the feed screw shaft and a fine feed thereof is performed by the axially expandable and contractable portion.

It is preferred that the axially expandable and contractable portion is provided with an elastic member elastically deformable in the axial direction and rigid in the rotating direction, a displacement generating means expandable and contractable in the axial direction and a fine feed amount detecting means for detecting a fine feed amount with respect to the nut portion, and it is also preferred that the amount of expansion or contraction of the finely displacing means is controlled in accordance with a value detected by the fine feed amount detecting means.

The displacement generating means is a means displacing in the axial direction in proportion to the command value when given, and for example, piezoelectric elements, electrostrictive elements, actuators expandable and contractable by the utilization of fluid pressure or thermal expansion, voice coils, or various acctuators by the utilization of magnetostrictive elements.

In a case where a movable table is used as the member to be fed, it is preferred that the movable table is attached to the nut portion, the movable table is movably supported and guided through a linear motion guide mechanism, and the feed screw shaft is rotated by the rotation driving means to thereby perform the rough feed movement.

It is characterized that the axially expandable and contractable portion is provided for the feed screw shaft so as to be capable of adjusting a support rigidity of the fixed member.

It is further characterized that the fixed member rotatably supports the feed screw shaft through a roller bearing capable of adjusting the preload of a rolling member of the roller bearing.

It is also characterized that a dynamic rigidity of an entire feed screw apparatus is adjusted by adjusting the preload of the rolling member.

It is also characterized that the axially expandable and contractable portion is provided for the fixed member to thereby adjust the entire position of the feed screw device.

The precise positioning and fine feed system according to this invention is characterized by comprising a feed screw shaft, a nut portion screwed with the feed screw shaft, an axially expandable and contractable portion disposed axially expandable and contractable with respect to the nut portion and provided with a displacement generating means, a rotation driving means for roughly moving the nut by a predetermined stroke with respect to the feed screw shaft by rotating the feed screw shaft by a predetermined amount in response to a predetermined rough feed control target signal, a fine feed control means for driving and controlling the displacement generating means in response to the output of the fine feed amount detecting means and the predetermined fine feed control target signal, and a command apparatus for imparting a rough feed control target signal to the rotation driving means and a fine feed control target signal to the displacement generating means.

It is preferred that the system further comprises a rough feed detecting means for detecting a rough feed amount of the nut with respect to the feed screw shaft and a rough feed control device for controlling the rotation driving means in response to an output of the rough feed amount detecting means and to a predetermined rough feed control target signal.

It is also preferred that a converter for converting the fine feed control target signal outputted from the command device to the fine feed control device from a digital signal to an analog signal, a control of the rotation driving means is performed by the digital signal and the control of the axially expandable and contractable portion is performed by the analog signal.

According to the precise positioning and fine feed system of the structure described above, the nut portion is linearly moved by a predetermined amount by rotation driving the feed screw shaft, thereby performing the rough feed of the movable member attached to the nut portion through the axially expandable and contractable portion. Furthermore, by driving the axially expandable and contractable portion, the member to be fed is finely moved with respect to the nut portion thereby feeding the same with extremely precise resolving power. As described above, even if the stroke of the axially expandable and contractable portion be a short stroke, the precise positioning between the long stroke can be made with high resolving power by the combination of the feed screw shaft and the axially expandable and contractable portion.

Furthermore, since the axially expandable and contractable portion is provided for the nut portion, the structure is made far compact in comparison with a conventional structure in which the table is piled.

Still furthermore, since the positioning and supporting are performed by the feed screw shaft and the axially expandable and contractable portion different from the prior art inch-worm mechanism in which the axial position is supported by clamping the shaft, a large axial load can be supported in comparison with the conventional inch-worm mechanism, and since the height of the system can be made small, the strength against the moment load can be made high.

Still furthermore, a minute vibration at the time of positioning can be avoided by operating the axially expandable and contractable portion to deny the vibration by applying an AC current to the axially expandable and contractable portion, thus remakably reducing the time required for the completion of the positioning.

According to the precise positioning and fine feed system, the rough and fine feed control target values are inputted into the command apparatus. Then, the feed screw shaft is rotated by the rotation driving means in response to the rough feed control target signal outputted from the command device. In accordance with this rotation of the feed screw shaft, the nut portion is linearly moved and the member to be fed is roughly moved by way of the axially expandable and contractable portion integrally moved with the nut portion and the member to be fed is positioned to the predetermined rough feed control target position.

Furthermore, the finely displacing means of the axially expandable and contractable portion is expanded or contracted by the fine feed control device in response to the output of the fine feed detecting means and the predetermined fine feed control target signal, and the member to be fed is positioned to the predetermined fine feed control target position.

Further, the rough feed amount detecting means is provided for detecting the rough feed amount of the nut portion with respect to the feed screw shaft and the rotation driving means is controlled in response to the output of the rough feed amount detecting means and the predetermined rough feed control target signal, thereby performing the positioning control more precisely.

Furthermore, it is made possible to carry out the analog control and the digital control by one command device by arranging a converter for converting the fine feed control target signal outputted from the command device to the fine feed control device from a digital signal to an analog signal, and performing a control of the rotation driving means by the digital signal and the control of the axially expandable and contractable portion by the analog signal.

Still furthermore, since the fine feed control is performed by the analog control, it is not necessary to locate any high frequency generation circuit for the fine feed control to the command device, thus making compact the circuit structure.

The axially expandable and contractable portion is composed of an elastic member deformable in the axial direction and rigid in the rotating direction and the finely displacing means for axially expanding or contracting the axially expandable and contractable portion.

Although it is preferred that the nut portion and the elastic member of the axially expandable and contractable portion are of the integral structure, the nut portion and the elastic member of the axially expandable and contractable portion can be made so as to provide a separate structure.

Further, it is characterized that a preload detecting means for detecting the axial preload applied between the nut portion and the feed screw shaft is disposed.

Furthermore, it is characterized that the expanding or contracting amount of the axially expandable and contractable portion is controlled in response to the detected value of the preload detecting means to thereby make the preload adjustable.

It may be possible for the preload detecting means to detect the preload from the axial displacement between the nut portions or from the axial load applied to the axially expandable and contactable portion.

It is preferred to detect the axial displacement between the nut portions from the strain of the elastic member.

As the displacement generating means, there is proposed piezoelectric elements, electrostrictive elements, actuators expandable and contractable by the utilization of fluid pressure or thermal expansion, voice coils, or various acctuators by the utilization of magnetostrictive elements, which displace in the axial direction in response to the command value when given.

In the feed screw appratus of the structure described above, the preload can be adjusted to an appropriate value by expanding or contracting the axially expandable and contractable portion disposed between the nut portions.

By constructing the elastic member of the axially expandable and contractable portion and the nut portion so as to provide an integral structure, it is not necessary to join the nut portions and the axially expandable and contractable portion, thus eliminating the causing of the joining error at the joined portion and the change of the preload characteristic based on the joined condition, thereby obtaining the designed characteristics. Further, the shaft shift between the nut portions and the axial inclination of the nut portions can be prevented.

Further, the manufacturing of the separate structure can be easily done.

Furthermore, by the structure in combination of the elastic member of the axially expandable and contractable portion and the finely displacing means and the structure of the elastic member to be elastically deformable in the axial direction and rigid in the rotating direction, there attains a function for preventing the rotation between the nut portions. Accordingly, it is not necessary to use a key or the like member having a large friction resistance as in the conventional structure, and hence, there is not provided an insensitive region and the response characteristic at the time of preload adjusting is improved.

Still furthermore, by disposing the preload detecting means between the nut portions, the actual preload can be directly detected. Further, by controlling the expansion or contraction of the axially expandable and contractable portion in response to this detected value, the preload between the nut portions can be always kept to the appropriate value.

BRIEF DESCRIPTION OF THE DRAWINGS

FIG. 8 is a sectional view of a modeled basic structure of the axial tension detecting means of the feed screw apparatus according to this invention.

FIGS. 9(a)–(e) are schematic sectional views of the various modifications of the axial tension detecting means of FIG. 3.

FIG. 10a is an elevational section showing one example of an elastic member of the axial tension detecting means, FIGS. 10(b)–(f) are plan views of various modifications of a thin ring member constituting the elastic member and FIGS. 10(g) and (h) are sectional view further showing other shapes of the elastic member.

FIG. 17 is a system diagram of the precise positioning and fine feed system according to this invention.

FIG. 18 is a view showing a concrete embodiment of the precise positioning and fine feed system according to this invention, in which FIG. 18(a) is an elevational section of an entire structure thereof and FIGS. 18(b) and (c) are sectional views of important portions for the explanatory of the operational condition of the axially expandable and contractable portion.

FIGS. 19(a)–(c) are plan views showing various modifications of the elastic member of the axially expandable and contractable portion of FIG. 18.

FIGS. 20(a)–(c) are views showing various arrangements of the elastic member and the finely displacing means of the axially expandable and contractable portion of FIG. 18.

FIGS. 21(a) and (b) are sectional views of important portions of a modified embodiment of the elastic member of the axially expandable and contractable portion of FIG. 18.

FIG. 22 represents another embodiment of the precise positioning and fine feed system according to this invention, in which

FIG. 36 is an elevational section of a split type pulling preload/displacement detection type feed screw apparatus.

FIGS. 41(a) through (f) is a view showing various modifications of a case in which an elastic member is provided for a feed screw shaft.

BEST MODE FOR EMBODYING THE INVENTION

Figure 1A:
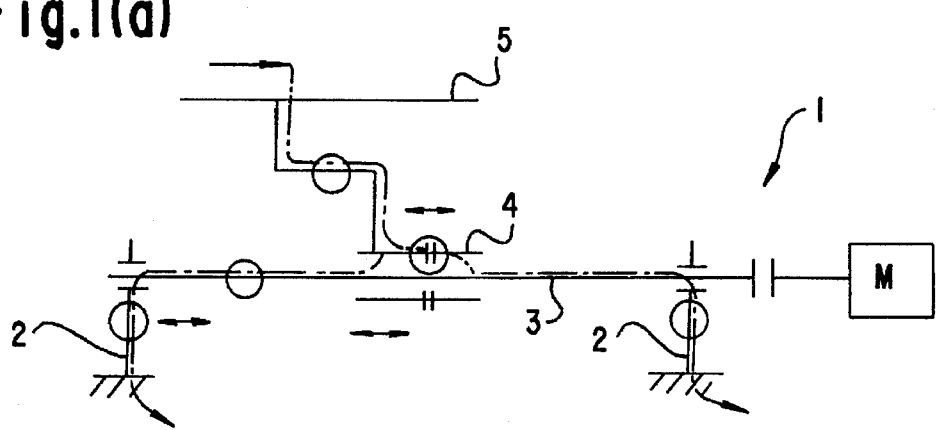
FIG. 1(a) is a view showing a conceptional structure of a feed screw apparatus according to this invention.

FIG. 1(a) shows a schematic structure of a feed screw apparatus according to this invention. Namely, the feed screw apparatus 1 comprises fixed members 2, a feed screw shaft 3 supported rotatably by the fixed members 2, a nut 4 mounted to the feed screw shaft 3 and a movable member 5 attached to the nut 4. A force is transferred to the movable member 5 from the fixed members 2 through the feed screw shaft 3 and the nut 4.

An elastic member which is elastically deformable in the axial direction is disposed at a portion through which the force of the feed screw apparatus 1 passes, and accordingly, the force is detected from the deformed state of the elastic member or the elastic member is elastically deformed by an actuator to displace the same.

Figure 1C:
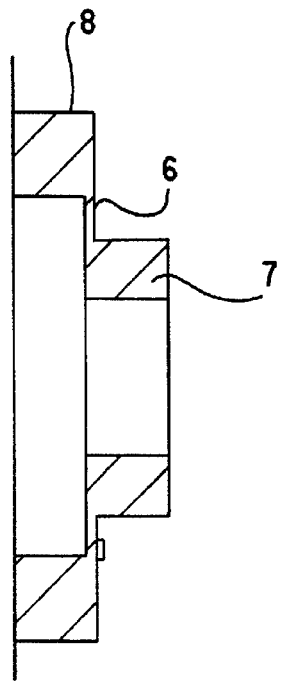
FIG. 1(c) is a sectional view showing one example of the elastic member and FIG. 1(d) is a plan view of the elastic member.
Figure 1B:
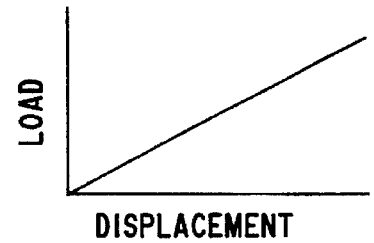
FIG. 1(b) is a view showing a spring characteristic of an elastic member.
Figure 1D:
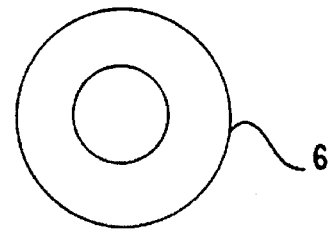

It is preferred for the elastic member to be deformed by several μm with 100 kgf and to have a spring characteristic as shown in FIG. 1(b) in which the load and the displacement have linear relationship.

It is possible to dispose the elastic member, as encircled in FIG. 1(a), to the fixed members 2, the nut 4, the feed screw shaft 3 or a portion between the nut 4 and the movable member 5.

FIGS. 1(c) and (d) show one example of the elastic member 6. The elastic member 6 is a plate spring formed by an annular flat thin member normal to the axial direction, and a pair of ring members 7 and 8 are integrally coupled to the elastic member 6 at its inner and outer diameter end portions so as to be elastically deformable in the axial direction and to provide a rigid structure in the rotational direction.

FIGS. 2(a) to (d) show plan views of various elastic members 6 formed with holes of various shapes.

Figure 2A:
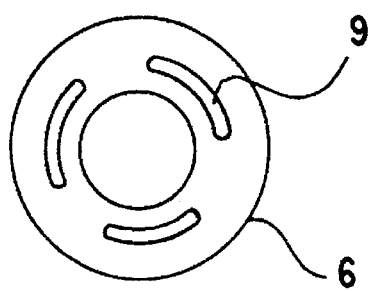
FIGS. 2(a)–(f) are views showing modifications of the elastic member.
Figure 2B:
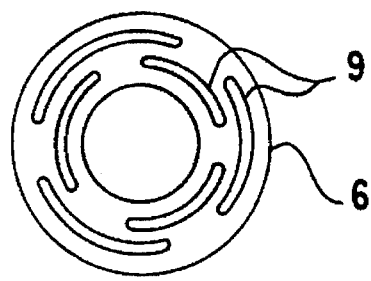
Figure 2C:
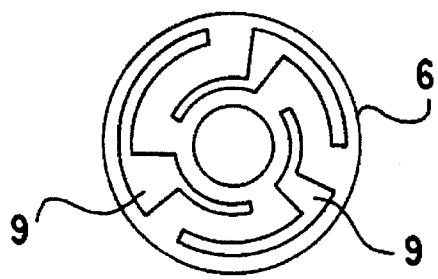
Figure 2D:
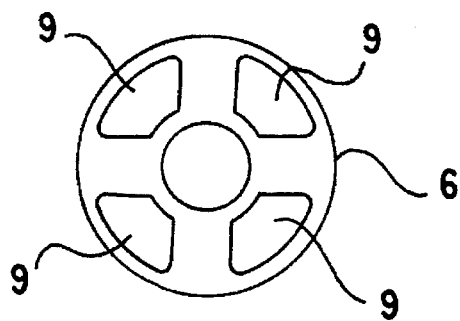
Figure 2E:
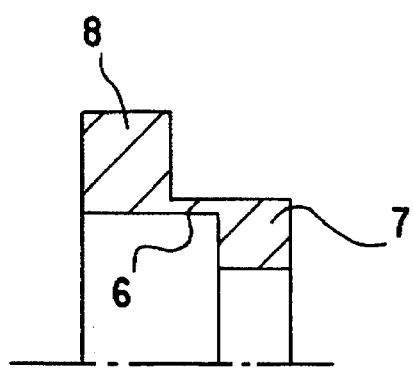
Figure 2F:
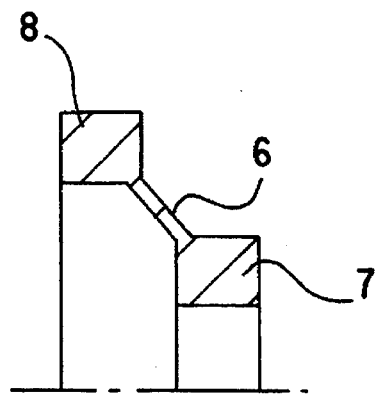

Further, it is not necessary for the elastic member 6 to have the annular flat shape shown in FIG. 1(c) and it may be formed to have a structure having thin cylindrical shape parallel to the axial direction as shown in FIG. 2(c) or to a structure having a conical inclination with respect to the axial direction as shown in FIG. 2(f), and at any rate, it is desirable to have a structure elastically deformable in the axial direction.

Next, a feed screw apparatus provided with an axial tension detecting sensor as means for detecting tension according to this invention will be described hereunder.

Figure 5:
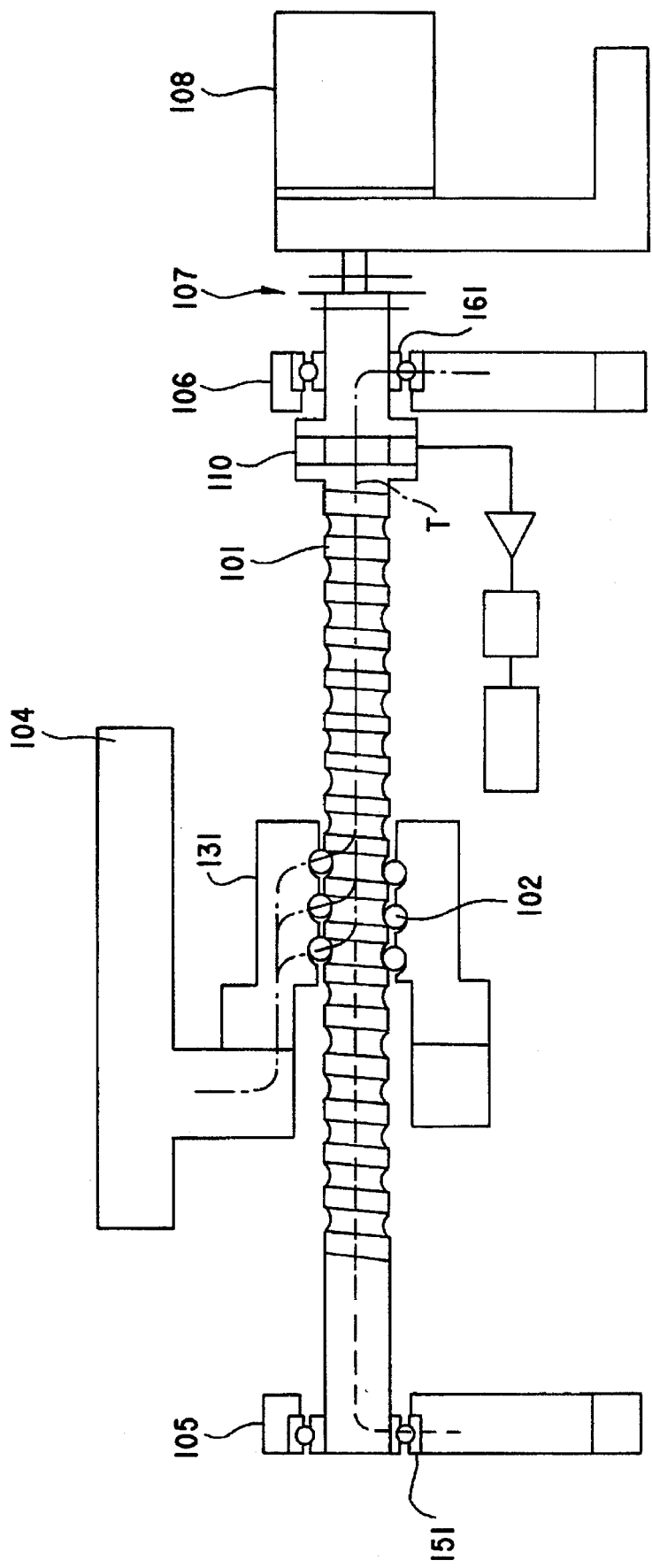
FIG. 5 is a view showing a conceptional structure of a third embodiment of a feed screw apparatus provided with an axial tension detecting means according to this invention.
Figure 6:
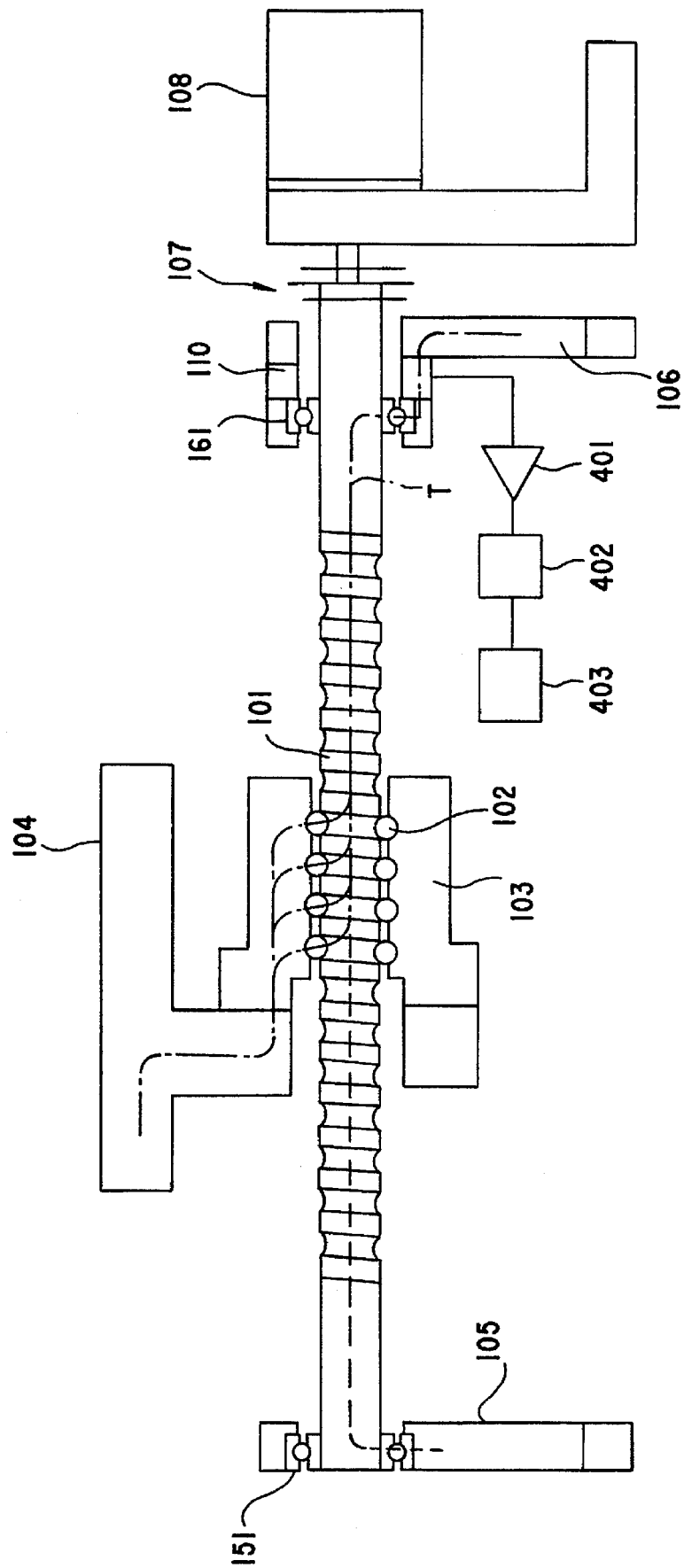
FIG. 6 is a view showing a conceptional structure of a fourth embodiment of a feed screw apparatus provided with an axial tension detecting means according to this invention.
Figure 7:
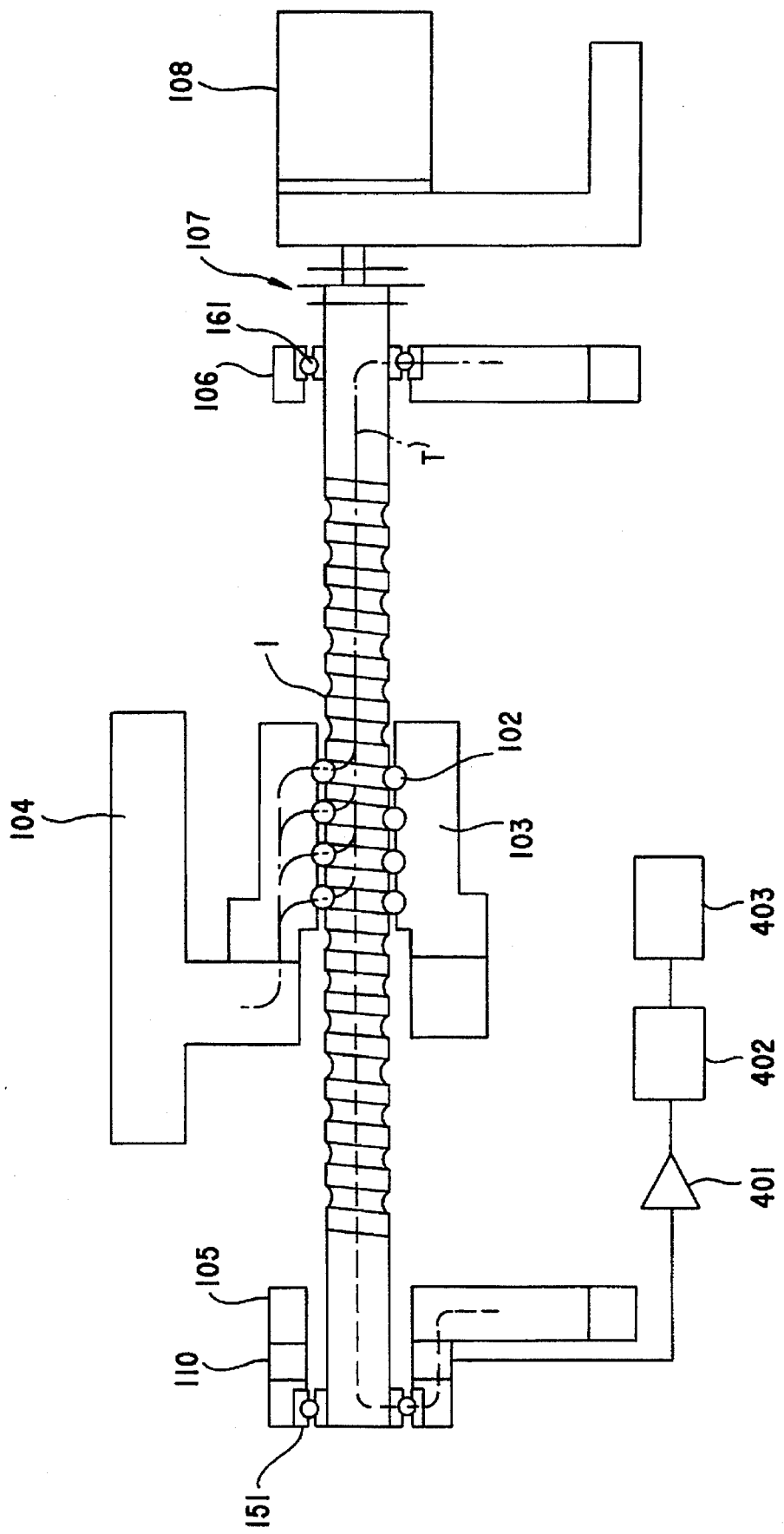
FIG. 7 is a view showing another conceptional structure of the fourth embodiment of a feed screw apparatus provided with an axial tension detecting means according to this invention.

FIGS. 3, 4, 5 and 6 show schematic structures of linear guide device provided with an axial tension detecting sensor according to first, second, third and fourth embodiments of this invention, respectively, and FIG. 7 represents a modified embodiment of the fourth embodiment.

These first, second, third and fourth embodiments have common basic structure for the feed screw device. Namely, the feed screw device is provided with a feed screw shaft 101, a nut 103 mounted to the feed screw shaft 101 through a number of balls 102 and a movable table 104 as a movable member attached to the nut 103. The feed screw shaft 101 has both ends supported rotatably but fixedly in an axial direction by first and second bearing tables 105 and 106 through support bearings 151 and 161, respectively, and one end, on the side of the second bearing table 106 in the illustrated embodiment, of the feed screw shaft 101 is operatively connected to a motor 108 through a joint member 107.

An axial tension detecting means 110 is provided for an axial tension acting portion T of the linear guide device. The axial tension is transferred to the feed screw shaft through a movable table 104 and the nut 103 and then to the first and second bearing tables 105 and 106 through the bilaterally disposed support bearings 151 and 161 supporting the feed screw shaft 101. The axial tension detecting means is provided for a proper portion of the axial tension acting portion T on which this axial tension acts.

Figure 3:
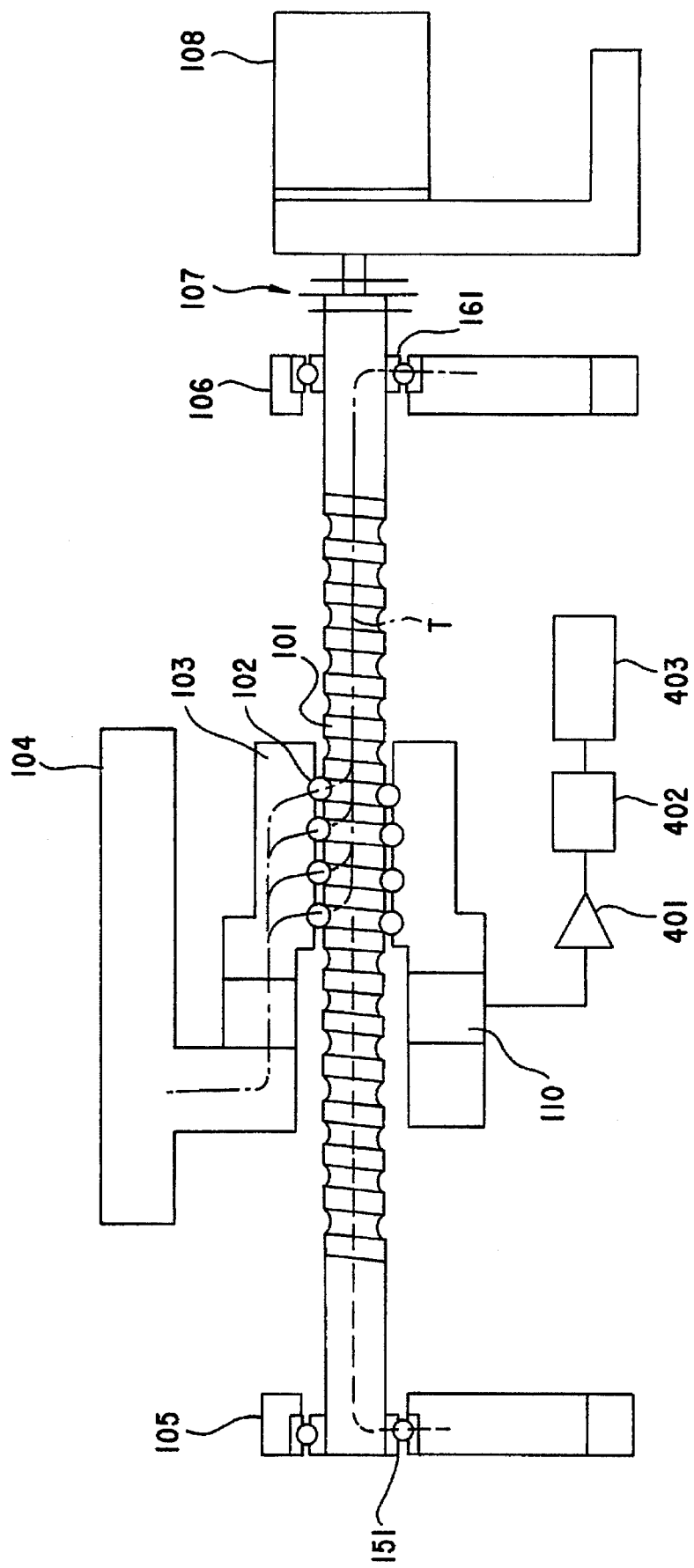
FIG. 3 is a view showing a conceptional structure of a first embodiment of a feed screw appratus provided with an axial tension detecting means according to this invention.

In the first embodiment of FIG. 3, the axial tension detecting means 110 is disposed between the nut 103 and the movable table 104.

Figure 4:
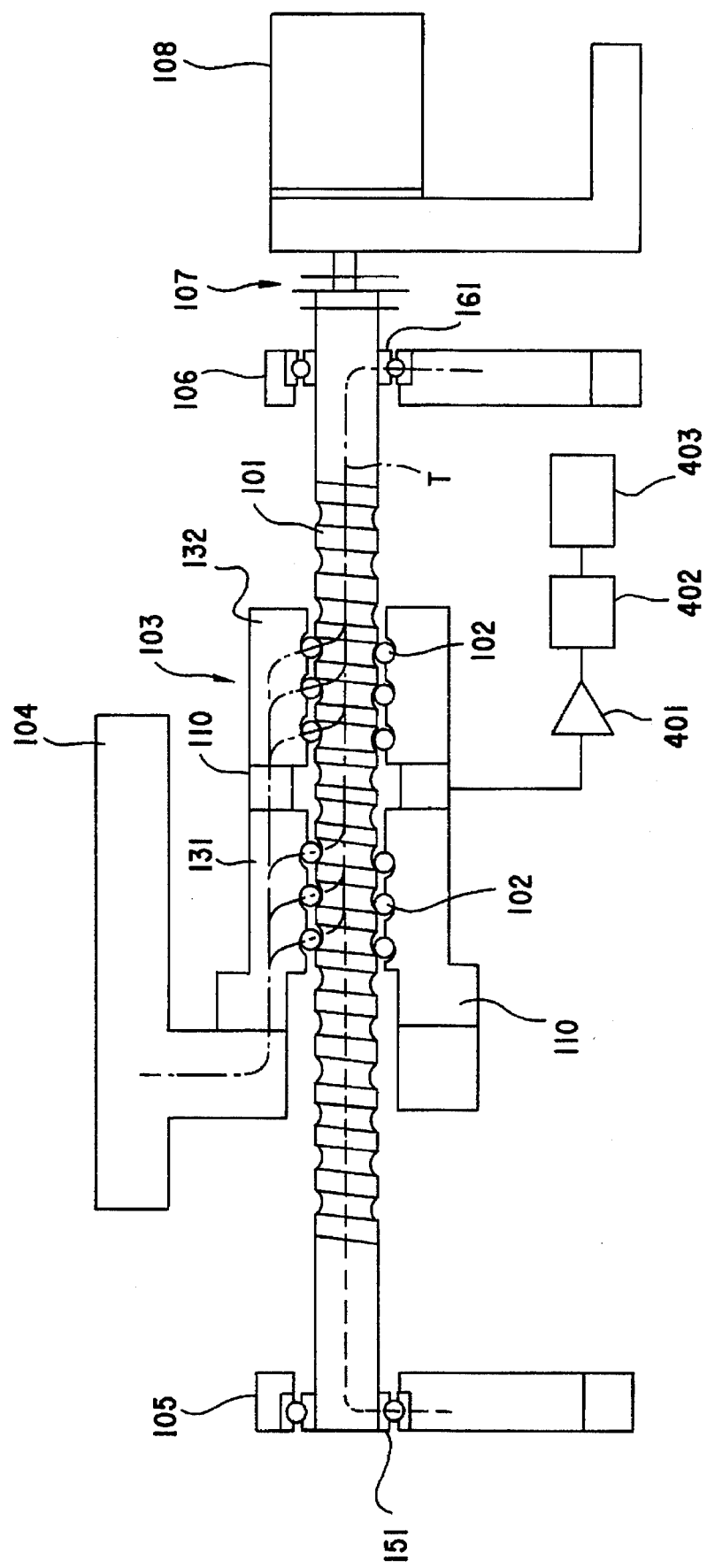
FIG. 4 is a view showing a conceptional structure of a second embodiment of a feed screw apparatus provided with an axial tension detecting means according to this invention.

In the second embodiment of FIG. 4, the nut 103 is composed of two nut bodies 131 and 132 and a washer or axial tension detecting means 110 interposed between these nut bodies and adapted to apply a preload, and the axial tension detecting means is provided for the washer.

In the third embodiment of FIG. 5, the axial tension detecting means 110 is provided for the feed screw shaft itself.

Furthermore, in the fourth embodiments of FIGS. 6 and 7, the axial tension detecting means 110 is provided for the bilateral support bearings 151 and 161, and that is, in the embodiment of FIG. 7, the axial tension detecting means 110 is provided for the support bearing 151 of the first bearing table 105 and in the embodiment of FIG. 6, the axial tension detecting means 110 is provided for the support bearing 161 of the second bearing table 106.

Common to the first, second, third and fourth embodiments, an electric signal detected by each of the axial tension detecting means 110 is amplified by a strain amplifier 401 and then converted into a digital signal by an A/D converter 402. The digital signal is then processed and judged as the axial tension information in a control unit 403.

The axial tension information is memorized in the control unit 403 by utilizing, for example, a computer, whereby the working condition can be modeled by utilizing experimental knowledge related to the working and then expected or facasted, thus being capable of performing correction.

Namely, by detecting the force in the axial direction of the feed screw shaft 401, it becomes possible to detect a shape change of a tool, to detect an abnormality, to recognize a configuration of the work and further to take a countermeasure at a time when a force more than preset value is applied to the work or tool. For example, in a case where a linear guide device provided with this axial tension detecting means is used for a Z-axis of the machining center, breaking of a drill can be prevented by detecting a working reacting force to be applied to the drill.

Further, it is made possible to model a work modified by the working force by utilizing a force to be applied to the work as information.

FIG. 8 is a schematic view of one model showing a basic structure of the axial tension detecting means. Namely, the axial tension detecting means 110 is comprised of an elastic member 111 elastically deformable in the axial direction, a detecting means 112 for converting the axial displacement or strain to an electric signal and then detecting the signal. The elastic member 111 is interposed between a fixed ring member 113 and a movable ring member 114, which are coaxially disposed, to couple them each other. The elastic member is elastically deformed in accordance with the change of the axial tension and the strain or displacement of this elastic member 111 is converted into an electric signal by the detecting means 112, thereby detecting the axial tension.

FIGS. 9(a) to (e) represent modifications of the detecting means 112 of the axial tension detecting means 110 mentioned above.

In the modification of FIG. 9(a), the strain of the elastic member 111 is detected by using a resistance sensor 112a such as strain gauge as the detecting means.

In the modification of FIG. 9(b), the displacement of the elastic member 111 is detected by using a voltage sensor 112b detecting a displacement as a voltage change by using detecting means such as piezoelectric element or electrostrictive element.

In the modification of FIG. 9(c), the displacement of the elastic member 111 is detected by using an electromagnetic induction sensor 112c such as differential transformer or vortex current sensor as detecting means.

In the modification of FIG. 9(d), the displacement of the elastic member 111 is detected by converting the displacement into an electric capacitance by using an electrostatic capacitance gap sensor 112d as detecting means.

In the modification of FIG. 9(e), the displacement of the elastic member 111 is detected by utilizing a light interference type optical fiber sensor 112e as detecting means.

Various types of sensors may be utilized for detecting the displacement of the elastic member without limiting the modifications described above.

FIG. 10 shows various modifications of the elastic member 111 of the axial tension detecting means 110 according to this invention.

In the modification of FIG. 10(a), the elastic member 111A is a plate spring composed by a thin portion of an annular flat plate normal to the axial direction, and has a shape elastically deformable in the axial direction and fixed in the rotating direction. A resistance sensor 112a is utilized as the displacement detecting means. The resistance sensor 112a is bonded to the fixed ring member 113 having the most large strain or a portion near a bonded portion to the movable ring member 114.

FIGS. 10(b) to (f) represent the plan shapes of the elastic member 111A, in which the elastic member 111A may be formed to have an annular plate shape as shown in FIG. 10(b) and may be formed to have shapes provided with holes 111B of various shapes as shown in FIGS. 10(c) to (f).

Further, the shape of the elastic member 111A is not limited to the annular plate-like shape normal to the axial direction such as shown in FIG. 10(a) and, for example, the shape may be formed to thin cylindrical shape parallel to the axial direction as shown in FIG. 10(g) or to inclined conical shape with respect to the axial direction. That is, it is desired for the elastic member 111A to have an elastically deformable shape in the axial direction.

Figure 11A:
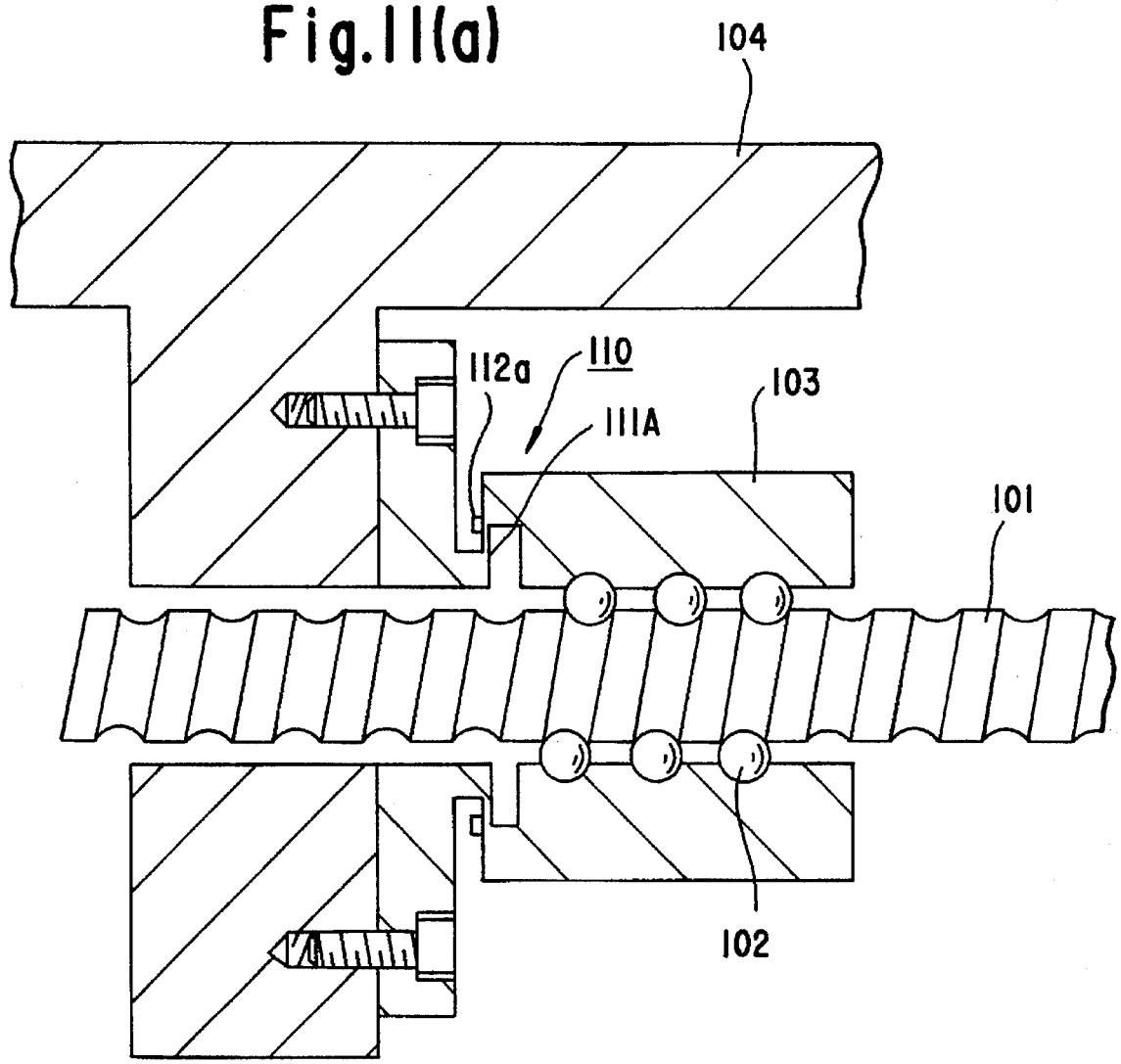
FIG. 11(a) is a sectional view showing more concretely the first embodiment of FIG. 3 and FIGS. 11(b) and (c) are enlarged sectional views of the axial tension detecting means.
Figure 11B:
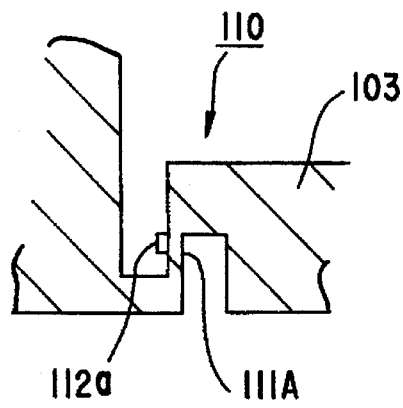
Figure 11C:
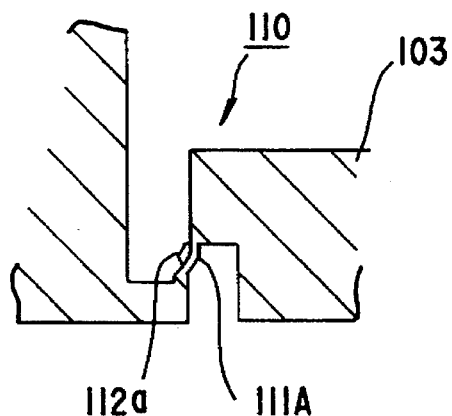

FIG. 11 shows a linear guide device showing a detailed structure of FIG. 1. This linear guide device has a structure basically similar to that of FIG. 3, in which the thin annular flat plate-like type, shown in FIG. 10(a), elastic member 111A of the axial tension detecting means 110 and which is integrally formed with the nut 103.

Then, as shown in FIGS. 11(b) and (c), the elastic member 111A is deformed in accordance with an axial load and the resistance of the resistance sensor 112a is changed in response to this deformation, thereby detecting the axial tension by this resistance change.

Figure 12:
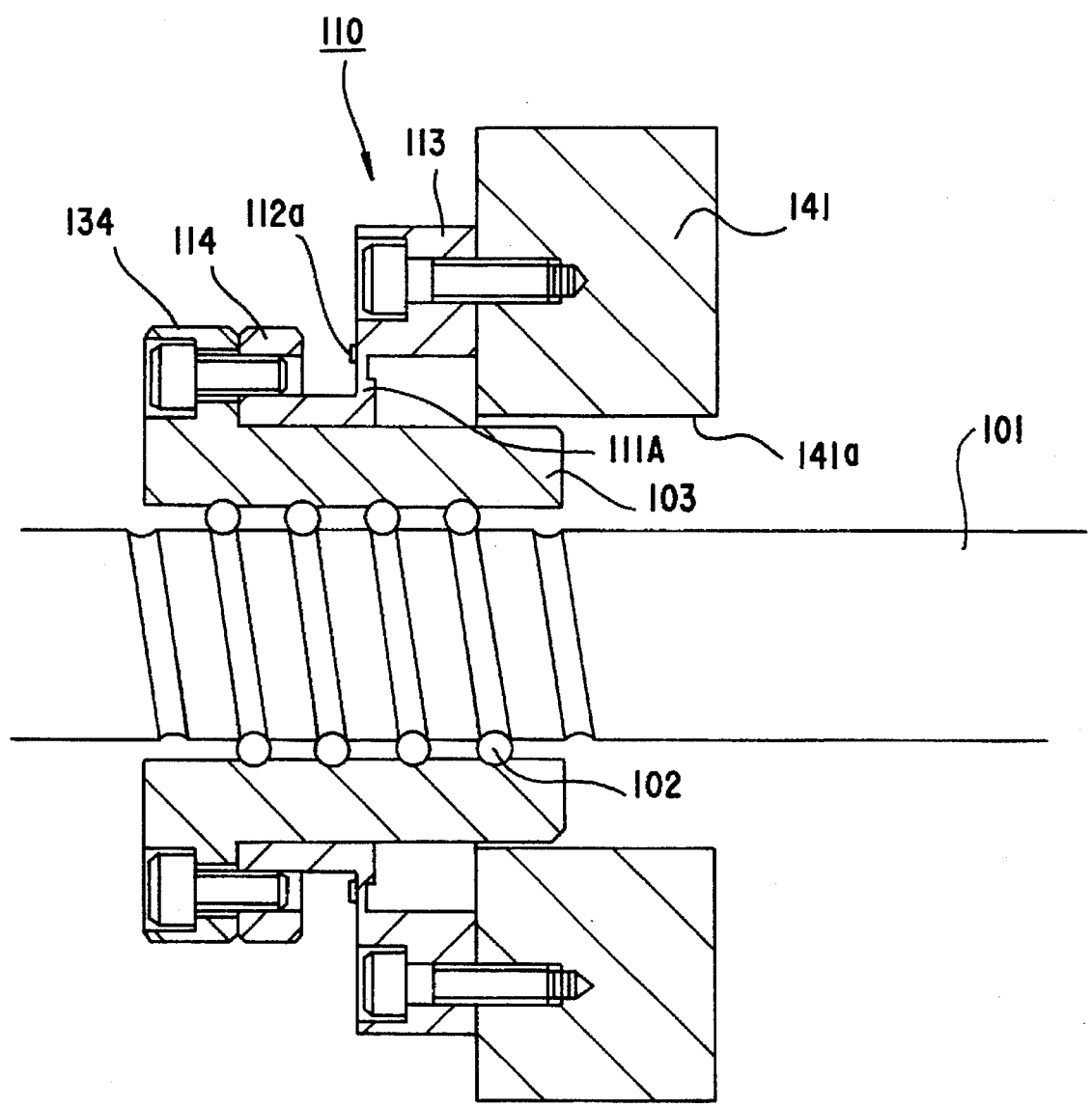
FIG. 12 is a sectional view representing a split type structure of FIG. 11.

In this modified embodiment, the axial tension detecting means 110 is constructed integrally with the nut 103, the axial tension detecting means 110 may be formed separately from the nut 103 as shown in FIG. 12.

In the illustrated embodiment, the nut 103 is fitted to an inner periphery of a mounting hole 141a of a fixed housing 141 of the movable table 104, and the axial tension detecting means 110 is interposed between an attachement flange 134 and an end face of the fixed housing.

The axial tension detecting means 110 is composed of the fixed ring member 113, the movable ring member 114 arranged coaxially with the fixed ring member 113, the elastic member 111A being elastically deformable in the axial direction and coupling the fixed and movable ring members 113 and 114, and the resistance sensor as detecting means mounted to the elastic member 111A.

This axial tension detecting means 110 has substantially cylindrical structure in which other parts or elements can be accommodated. The detecting means 110 is subjected to pulling force or contracting force, so that the fixed ring member 113 and the movable ring member 114, both constituting both end members, are coupled with the screw. The surface receiving the force thereof has two perpendicular flat faces with respect to the axial direction.

Figure 13:
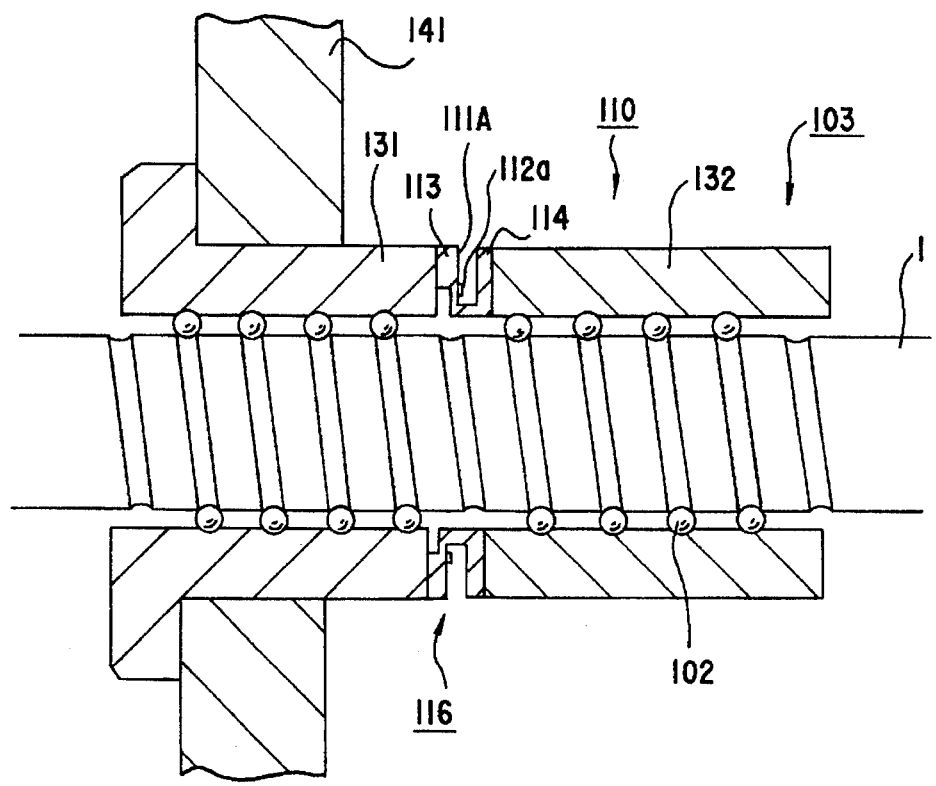
FIG. 13 is a sectional view showing more concretely the second embodiment of FIG. 4.

FIG. 13 is a view showing detailed structure of the detecting means 110 of FIG. 4 in combination of the nut 103 and the washer 116.

Namely, the nut 103 is provided with nut bodies 131 and 132 and the washer 116 interposed between these nut bodies 131 and 132, and one 131 of the nut bodies is fixed to the fixed housing 141. The washer 116 is composed of the fixed ring member 113 fixed to the other one 132 of the nut bodies, the movable ring member 114 fixed to one 131 of the nut bodies, the thin elastic member 111A coupling the fixed and movable ring members 113 and 114 together and the resistance sensor 112a such as strain gauge detecting the axial displacement or strain of the elastic member 111A.

According to the structure described above, the axial load acting on the feed screw shaft 101 is transferred to the nut bodies 131 and 132 through the balls 102. Since the nut body 131 is fixed to the fixing housing 141, the nut body 132 of the movable side is displaced in the axial direction and the elastic member 111A is then elastically deformed. The axial tension acting on the feed screw shaft 101 can be detected by detecting the axial strain of the elastic member 111A by means of the resistance sensor 112a.

Figure 14:
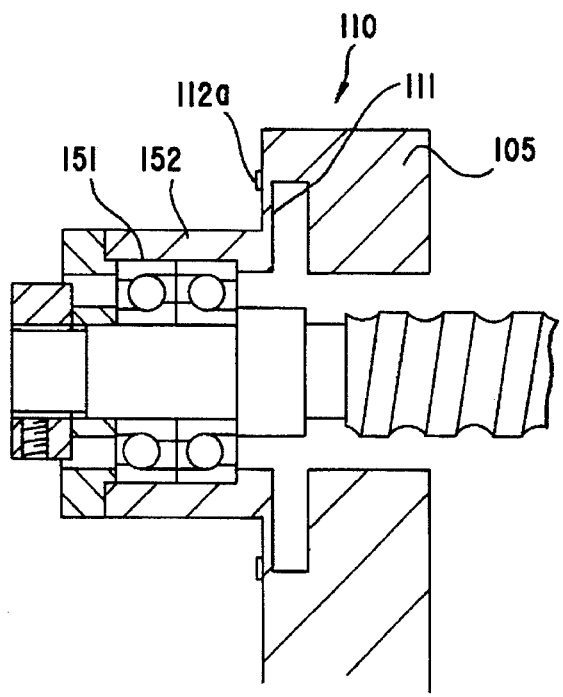
FIG. 14 is a sectional view showing more concretely the fourth embodiment of FIG. 6.

FIG. 14 shows a structure in combination of the axial tension detecting means of FIG. 6 with a support bearing 151 rotatably supporting the screw shaft.

The support bearing 151 is of an angular contact type structure and attached to the bearing table through the axial tension detecting means 110. The axial tension detecting means 110 is composed of the plate spring type elastic member 111A coupling a bearing housing 152 to be fitted to the outer periphery of the support bearing 151 and the bearing table 105 and the resistance sensor 112a bonded to the elastic member 111A, which is elastically deformable in the axial direction and rigid in the circumferential direction.

As described above, by providing the axial tension detecting means to the axial tension acting portion, the axial tension actually acting on the linear guide device can be directly detected.

Further, by detecting the displacement or strain of the elastic member elastically deformed in response to the axial tension, the axial tension can be detected with high precision.

Furthermore, in a case where both the axial tension and the torque act together such as in the case of the feed screw shaft, it is absolutely necessary to locate the rotation preventing means and it is thus effective to provide the rotation preventing function to the elastic member by forming it so as to provide rigid structure with respect to the rotating direction.

Figure 15A:
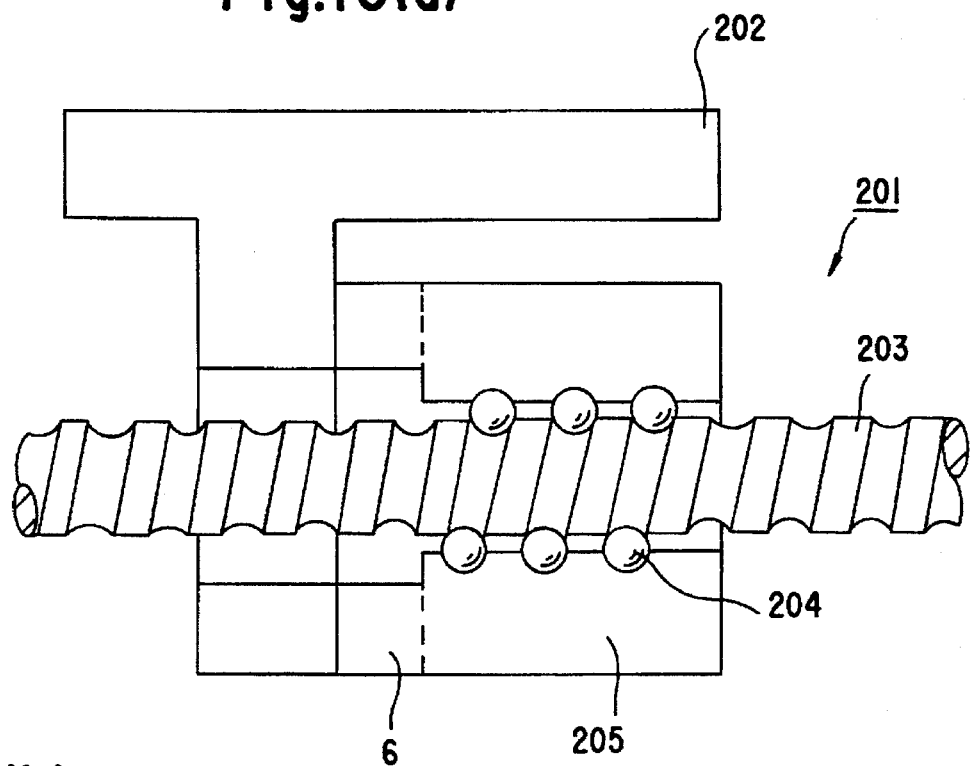
FIG. 15(a) is a view showing a conceptional structure of a precise positioning and fine feed system according to this invention.

FIG. 15(a) shows a schematic structure in which the precise positioning and fine feed device of this invention is adapted to a table moving device such as machine tool.

Namely, the precise positioning and fine feed device 201 is adapted to linealy move a movable table 202 as a member to be fed and is provided with a feed screw shaft 203, a nut portion 205 screwed to the feed screw shaft 203 through balls 204 and an axially expandable and contractable portion 206 which is expandable and contractable in the axial direction with respect to the nut portion 205. The axially expandable and contractable portion 206 is disposed integrally with one end face of the nut portion 205 and the movable table 202 is attached to this axially expandable and contractable portion 206.

When the feed screw shaft 203 is rotated, the nut portion 205 is fed by a predetermined amount in the axial direction and the table is roughly moved together with the nut portion 205 through the axially expandable and contractable portion 206 by a predetermined amount. Furthermore, by expanding or contracting the axially expandable and contractable portion 206 in the axial direction, the table can be finely fed and precisely positioned.

Figure 15B:
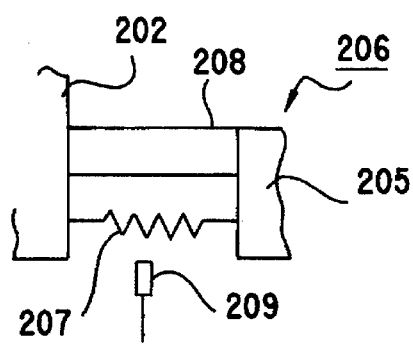
FIG. 15(b) is a view showing a conceptional structure of an axially expandable and contractable portion of the system of FIG. 15(a) and FIGS. 15(c) and (d) are views showing structures of the axially expandable and contractable portion utilizing a fluid pressure actuator as the finely displacing means.

FIG. 15(b) shows a schematic structure of the axially expandable and contractable portion 206, which is provided with an elastic member 207 being elastically deformable in the axial direction and rigid in the rotating direction, a fine displacing means 208 such as piezoelectric element and electrostrictive element expandable and contractable in the axial direction, and a displacement detecting means 209 for detecting the axial expanded and contracted amount, i.e. fine feed amount, of the axially expandable and contractable portion 206, whereby the stroke of the fine displacing means 208 in accordance with a value detected by the displacement detecting means 209 can be controlled.

Figure 15C:
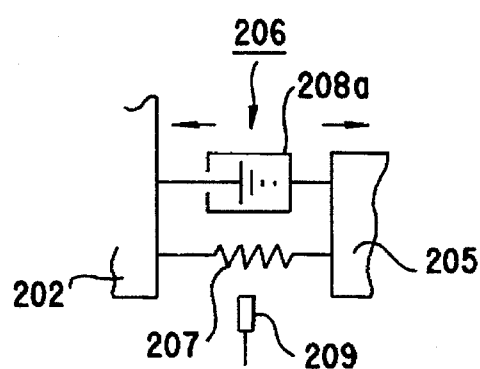
Figure 15D:
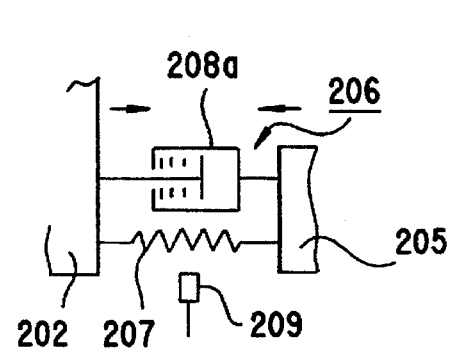

There may be utilized, as the fine displacing means, other than the piezoelectric element or electrostrictive element, various actuators such as a thermal actuator for expanding or contracting the expandable and contractable portion by utilizing a thermal expansion of an object, an actuator for expanding or contracting it by way of fluid pressure such as shown in FIGS. 15(c) and (d), a voice coil and a magnetostrictive element. In other words, there may be utilized various actuators which are expandable or contractable in proportion to a command value.

Figure 16A:
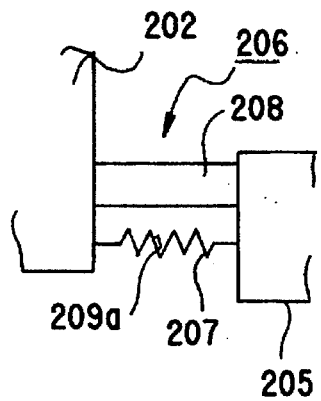
FIGS. 16(a)–(e) are views showing structures of various modifications of the displacement detecting means of the axially expandable and contractable portion of FIG. 15.
Figure 16B:
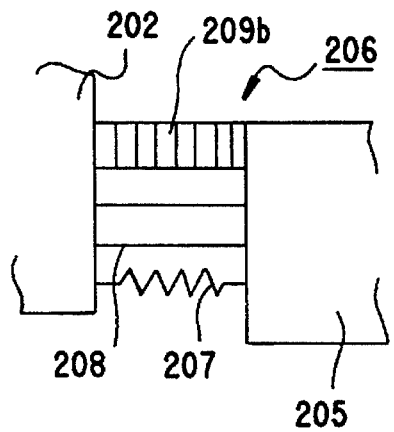
Figure 16C:
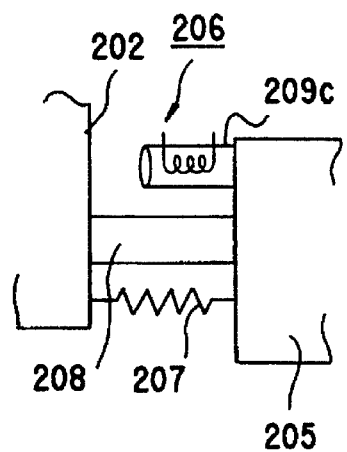
Figure 16D:
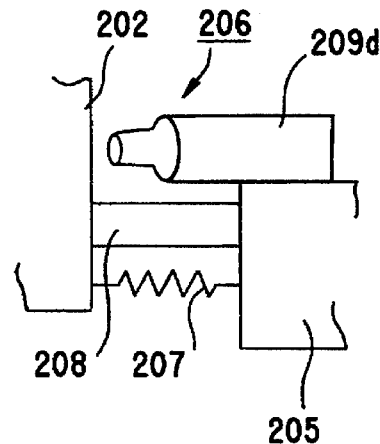
Figure 16E:
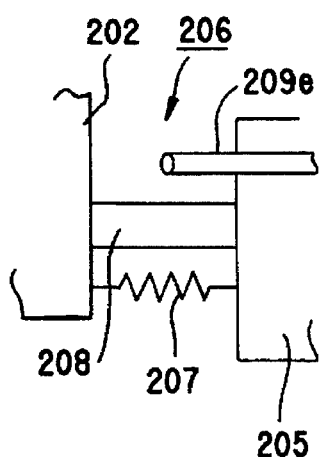

Further, as the displacement detecting means, there are utilized a resistance sensor such as strain gauge as shown in FIG. 16(a), a sensor detecting the displacement as voltage change by using a piezoelectric element as shown in FIG. 16(b), an electromagnetic induction sensor 209c such as differencial transformer or vortex current sensor as shown in FIG. 16(c), an electrostatic capacitance sensor as shown in FIG. 16(d), a light interference sensor utilizing an optical fiber as shown in FIG. 16(e), and other various sensors which are capable of detecting the fine displacement.

FIG. 17 shows a control structure for the precise positioning and fine feed system of this invention.

The table 202 to be fed is linearly guided by a linear motion guide mechanism 217, and the linear motion guide mechanism 217 comprises a track rail 217a and a guide mechanism body 217c slidably assembled to the track rail 217a through a rolling member 217b.

A control system generally includes a rough feed control system for driving and controlling the feed screw shaft 203 and a fine feed control system for controlling the axially expandable and contractable portion 206.

The rough feed control system is composed of a linear scale 210 for detecting the position of the movable table 202, a motor 211 as rotating and driving means for rotating and driving the feed screw shaft 203, a motor driver 212 for driving the motor 211 and a command device 213 outputting a command signal to the motor driver 212 as a rough control object.

On the other hand, the fine feed control system is composed of a fine displacing means driver 214 for driving the fine displacing means 208, a displacement detecting means 209 for detecting the axial stroke of the finely displacing means 208, and fine feed control device 215 for controlling the feed of the axially expandable and contractable portion 206. A digital command signal as fine control object from the command device 213 is converted into an analog signal through a D/A converter 216 and then inputted into the fine feed control device 215.

In the precise positioning and fine feed system of the above structure, a feed amount as an object or targent is first inputted into the command device 213.

A command signal as a rough feed control object is transmitted into the motor driver 212 in accordance with this aimed feed amount, and in response to this command signal, the motor 211 is driven to be rotated. According to the driving of the motor 211, the feed screw shaft 203 is rotated, the nut 205 moves linealy in response to the rotation of the feed screw shaft 202, and the movable table 202 is then roughly fed to the predetermined position and then stopped there.

The rough feed control may be constructed as a closed loop control for feeding back the position of the movable table 202, while always monitoring the same, to the motor driver by using the linear scale 210 as the rough feed amount detecting means and correcting deviation from the aimed position through the function or operation of the motor driver 212 as the rough feed control means.

After the stopping of the feed screw shaft 203, the fine feed of the movable table 202 is carried out by the axially expandable and contractable portion 206. This fine feed is performed by a resolving power more precisely than that of the rough feed of the feed screw shaft 203, and for example, the feeding of the amount less than micron unit is performed by the axially expandable and contractable portion 206.

Namely, the command signal as the fine control object from the command device 213 is converted into an analog signal by the D/A converter 216 and then inputted into the fine feed control device 215. A driving signal is transmitted to the finely displacing means driver 214 in response to this command signal, thereby expanding or contracting the finely displacing means 208 such as piezoelectric element. The stroke of the finely displacing means 208 is always detected by the displacement detecting means 209 and then fedback to the fine feed control device 215, thereby exactly positioning the movable table 202. According to the provision of the axially expandable and contractable portion 206, it is made possible to provide the resolving power suitable for carrying out nanometer feeding far precisely in comparison with the ball screw feed means.

Further, even if the axially expandable and contractable portion 206 has a short stroke, it can be moved with high speed between a long stroke by means of the feed screw shaft 203.

On the while, in an actual operation, there is an error from the inputted aimed position because of a working error of the lead of the feed screw shaft 203 and thermal expansion of the feed screw shaft 203 due to a temperature change, but this error is corrected by operating the axially expandable and contractable portion 206 to thereby make it possible to exactly position the movable table.

Namely, this is performed by preliminarily inputting data regarding the working error of the lead of the feed screw shaft and the axial thermal expansion of the feed screw shaft due to the temperature change and calculating a correction amount from this data and the data of the object inputted from the command device 213. The calculated and corrected amount is then inputted into the finely displacing means driver 214 and, by driving the finely displacing means such as piezoelectric element as the aimed value, the movable table 202 can be exactly positioned to the aimed position.

The driving motor 211 of the feed screw shaft 203 is pulse controlled and the axially expandable and contractable portion 206 can be controlled by two different control systems controlled by the different analog command values, so that it is not necessary to use the command device 213 provided with the high resolving power but not high frequency, thus making compact the circuit construction, being effective.

Furthermore, there is a problem of a minute vibration at the positioning time in relation to the precise positioning of the movable table. This is based on such a phenomenon as that the movable table 202 or the like is minutely vibrated due to an inertia force. Such problem of the minute vibration can be solved by operating the axially expandable and contractable portion 206 so as to deny such vibration, thus making remakably short the positioning completion time.

FIG. 18 is a more concrete embodiment of the precise positioning and fine feed system of this invention.

Namely, the system of this embodiment is composed of a feed screw shaft 232, a nut portion 225 screwed with the feed screw shaft 232, an axially expandable and contractable portion 226 and a flange portion 225a to which the movable table 202 is mounted, the nut portion 225, the axially expandable and contractable portion 226 and the flange portion 225a having integral structure. A number of balls 204 are disposed in a groove formed between the nut portion 225 and the feed screw shaft 203 in a rollable manner.

The axially expandable and contractable portion 226 is composed of an elastic member 227 which is elastically deformable in an axial direction and rigid in a rotating direction, a fine displacing means 228 such as piezoelectric element disposed between the opposing surfaces of the nut portion 225 and the flange portion 225a, and a displacement detecting means 229 for detecting the axial displacement.

The elastic member 227 is a plate spring formed by a thin portion of an annular plate like member perpendicular to the axial direction and is elastically deformable in the axial direction and rigid in the rotating direction thereof. The outer end of the elastic member 227 is integrally connected to the nut portion 225 and the inner end thereof is integrally connected to the flange portion 225a.

A strain gauge is utilized as the displacement detecting means 229 and is bonded to the surface of the elastic member 227 to thereby detect a strain amount of the elastic member 227 which is deformable in accordance with the displacement. The displacement detecting means 229 is bonded to a portion at which the strain of the elastic member is made maximum as shown in FIGS. 18(b) and (c), i.e. in the illustration, a portion near the connection end of the elastic member 227.

The elastic member 227 may be formed so as to have an annular flat plate shape as shown in FIG. 19(a) or to have a shape provided with a proper hole 227a as shown in FIG. 19(b) or (c).

FIGS. 20 (a) to (c) represent structures showing arrangement of the finely displacing means and the elastic member.

In FIG. 20 (a), the elastic member 227 and the finely displacing means 228 are both formed in ring shape and arranged coaxially.

In FIG. 20(b), the structure includes a bar-like finely displacing means 228a and a ring-like elastic member 227, and in the illustrated embodiment, three bar-like finely displacing means are arranged.

In FIG. 20(c), the bar-like finely displacing means 228a is used and an elastic member 227b is split circumferentially so as to escape the bar-like finely displacing means 228a.

Further, it is not necessary for the elastic member to have the thin annular flat plate shape perpendicular to the axial direction as described above and, for example, as shown in FIG. 21(a), a structure conically inclined with respect to the axial direction may be adapted. Otherwise, as shown in FIG. 21(b), the elastic member may have a thin cylindrical structure parallel to the axial direction. That is, in short, a structure elastically deformable in the axial direction and rigid in the rotating direction may be adapted for the elastic member.

Figure 22A:
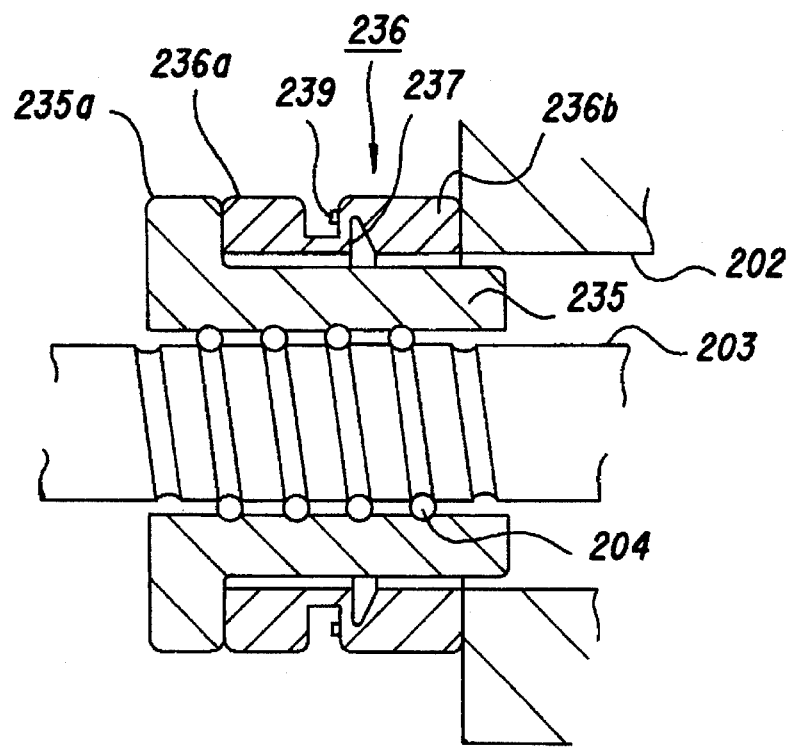
FIG. 22(a) is an elevational section of an entire structure thereof.
Figure 22B:
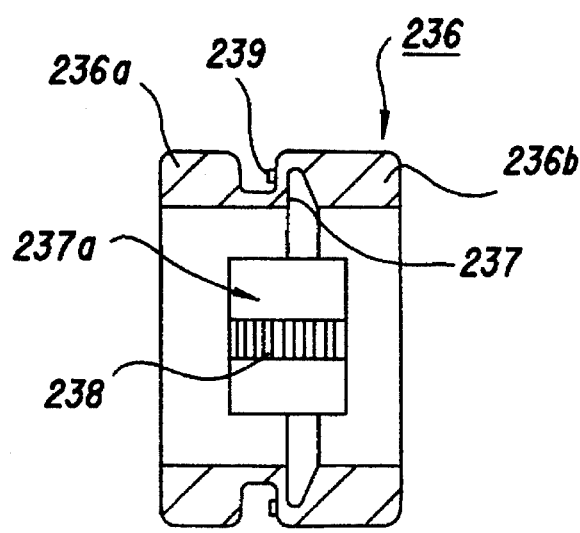
FIG. 22(b) is an elevational section of the axially expandable and contractable portion.
Figure 22C:
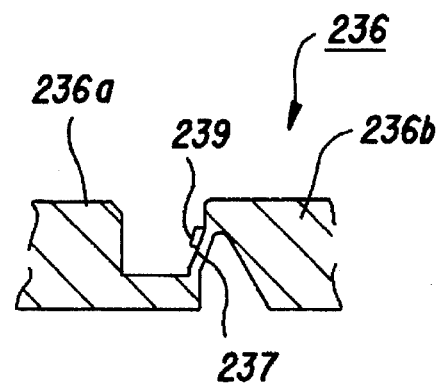
FIG. 22(c) is an enlarged sectional view of an necessary portion of a deformed state of the elastic member of the axially expandable and contractable portion.

Although the above described embodiments show structures each in which the nut portion and the axially expandable and contractable portion are formed integrally, a separate structure may be adapted as shown in FIG. 22 as occasion demands.

Namely, an elastic member 237 and a finely displacing means 238 such as piezoelectric element of an axially expandable and contractable portion 236 are interposed between annular first and second holders 236a and 236b which are opposed in parallel with each other. The elastic member 237 is composed of a plate spring formed by the thin portion of the annular plate like member likely in the embodiment of FIG. 18, and the inner end of the elastic member is coupled to the first holder 236a and the outer end thereof is coupled to the second holder 236b so as to provide an integral structure. Further, a resistance sensor such as strain gauge is used as the displacement detecting means 239, which is bonded to the surface of the elastic member 237.

In the illustrated embodiment, a bar-like member is used as the finely displacing means 238, and the elastic member 237 is partially cut out to form a cutout hole 237a in which the fine displacing means 238 is mounted.

This axially expandable and contractable portion 236 is assembled to the outer peripheral side of the nut portion 235, the first holder 236a is bonded to the flange portion 235a of the nut portion 235, and the second holder 236a is then attached to the table 202.

In another point of view, the axially expandable and contractable portion 236 has substantially a cylindrical structure capable of accommodating other parts therein and is subjected to the pulling and compressing force, so that the first and second holders 236a and 236b as end members are engaged with the screws. A surface receiving the force is composed of two flat faces perpendicular with respect to the axis of the elastic member.

In such split type structure, because an error is caused at the joined portion of the axially expandable and contractable portion 236 and the nut portion 235, an adjustment therefor is required and the characteristics are likely changed in accordance with the joined condition. With this point of view, the integral structure has no joined portion and the designed characteristics can be attained, thus being advantageous. However, in the split type structure, the manufacture is relatively easily done, being advantageous. Accordingly, it will be said that it is a matter of selection as to whether the integral structure or split structure should be adapted.

It should be naturally understood that the shape of the elastic member shown in FIG. 19, the arrangement of the elastic member and the fine displacing means of FIG. 20 and the modifications of the elastic member of FIG. 21 are applied to the embodiment of the split type structure.

As described hereinbefore, in the present invention, since the rough feed can be done by the feed screw shaft and the nut portion and the fine feed is made by the axially expandable and contractable portion, the precise positioning and fine feed system having high resolving power and long stroke can be realized.

Moreover, since the axially expandable and contractable portion is provided for the nut portion, the structure can be made far compact in comparison with a conventional structure in which a table is piled up.

Furthermore, since the axial position is not supported by a clamp as in the conventional inch-worm mechanism and the position is determined and supported by the finely displacing means and the feed screw shaft, an axial large load can be supported. Since the height of the system itself made low, the precise positioning and fine feed system strong against a moment load can be realized.

Still furthermore, the problem of the minute vibration caused at the positioning time can be solved by operating the axially expandable and contractable portion so as to deny the vibration, thus completing the positioning operation for a short time.

Further, according to the precise positioning and fine feed system of this invention, the precise positioning and the fine feed can be smoothly and surely carried out.

Furthermore, the command management for the fine feed control and the rough feed control can be performed by one command device by incorporating a converter for converting the fine control target signal transmitted from the command device to the fine feed control device from a digital signal to an analog signal.

Still furthermore, by performing the fine feed control through the analog control, it is not necessary to provide, for the command device, a high frequency generation circuit for the fine feed control, thus making simple the circuit structure and reducing the manufacturing cost.

Further, in the described embodiments, the axially expandable and contractable portion is arranged between the nut and the movable table, but the axially expandable and contractable portion may be constructed by arranging an actuator such as piezoelectric element parallel to the elastic member 111 to the fixed member as shown in FIG. 14, thereby being capable of adjusting the entire position of the feed screw shaft and finely changing the member to be fed (not shown).

Figure 23A:
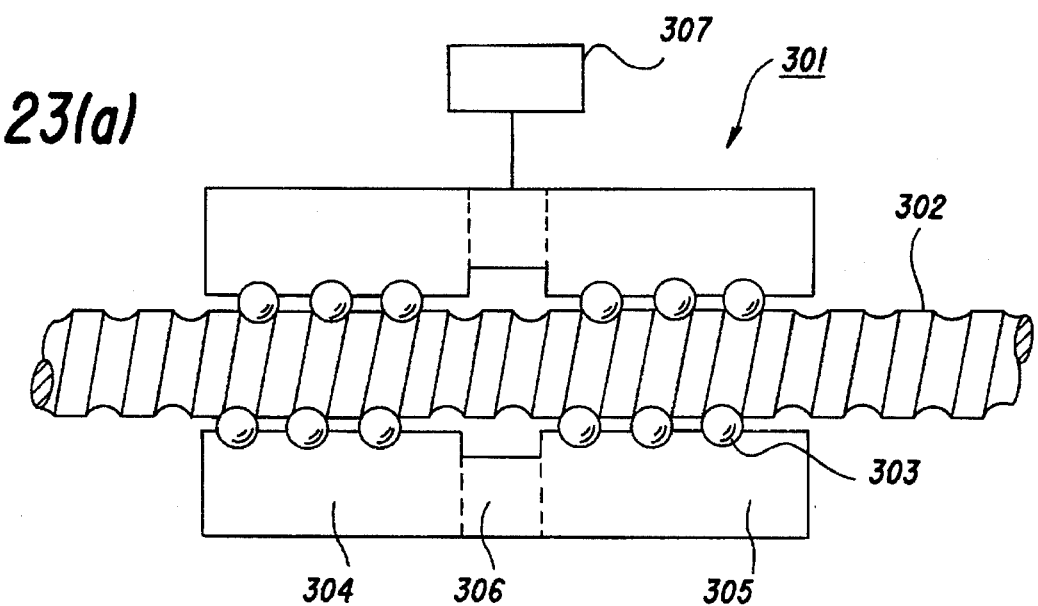
FIG. 23(a) is an elevational section showing a basic structure of a feed screw apparatus according to this invention.

FIG. 23(a) shows a basic structure of a feed screw system provided with a preload adjusting mechanism according to this invention. Namely, reference numeral 301 denotes an entire feed screw system, which is provided with a screw shaft 302, first and second nut portions 304 and 305 screwed with the screw shaft 302 through balls 303, and an axially expandable and contractable portion 306 interposed between the first and second nut portions 304 and 305.

This axially expandable and contractable portion 306 is expandable and contractable in the axial direction and a preload adjustment can be done by variably controlling the gap between the first and second nut portions 304 and 305. A preload detecting means 307 is provided between the first and second nut portions 304 and 305 for detecting the preload, and an amount of expansion or construction of the axial expandable and contractable portion 306 can be controlled in accordance with the detected value.

Figure 23B:
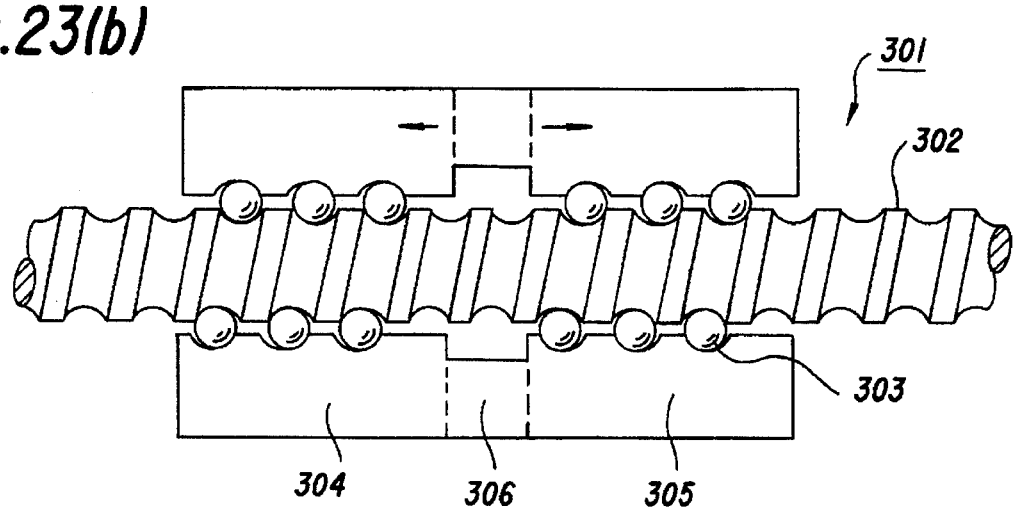
FIG. 23(b) is an elevational section showing a pulling preload state.
Figure 23C:
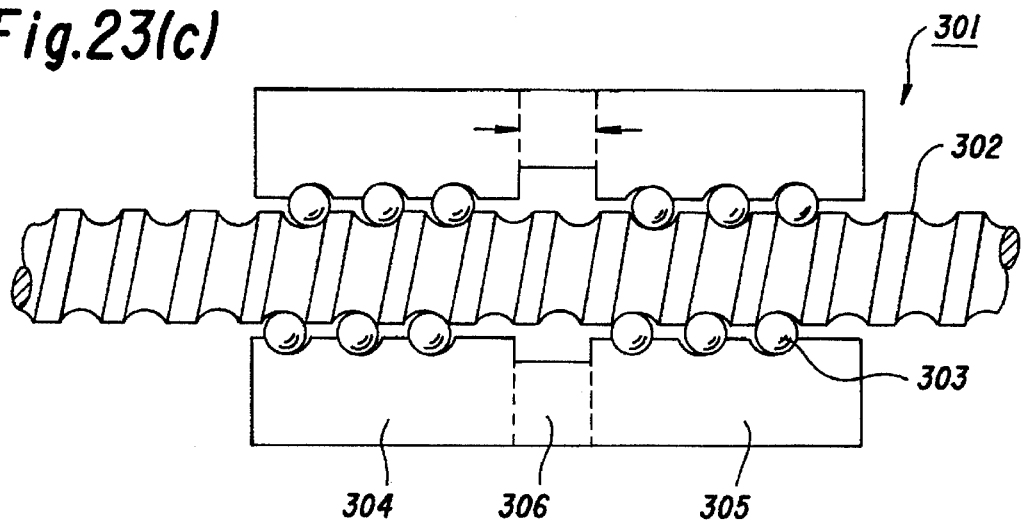
FIG. 23(c) is an elevational section showing a compression preload state.

The above mentioned preload applying methods includes a pulling type preload applying method, as shown in FIG. 23(b), in which the axially expandable and contractable portion 306 is expanded by an amount corresponding to the preload to press the first and second nuts 304 and 305 in a direction axially apart from each other to thereby apply a pulling load to the screw shaft 302, and a compression type preload applying method, as shown in FIG. 23(c), in which the axially expandable and contractable portion 306 is contracted by an amount corresponding to the preload to thereby apply the compression load to the screw shaft 302.

Figure 24A:
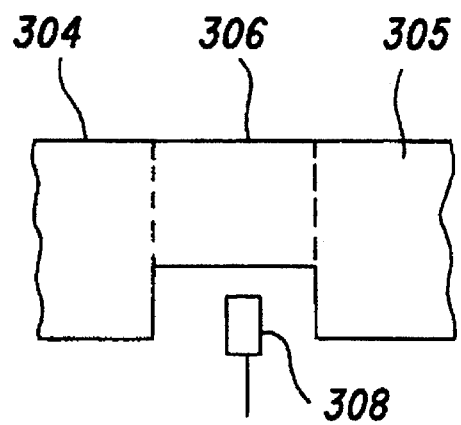
FIG. 24(a) is a view showing a portion in the vicinity of the axially expandable and contractable portion in a case where the displacement detecting means is utilized as the preload detecting means of FIG. 23
Figure 24B:
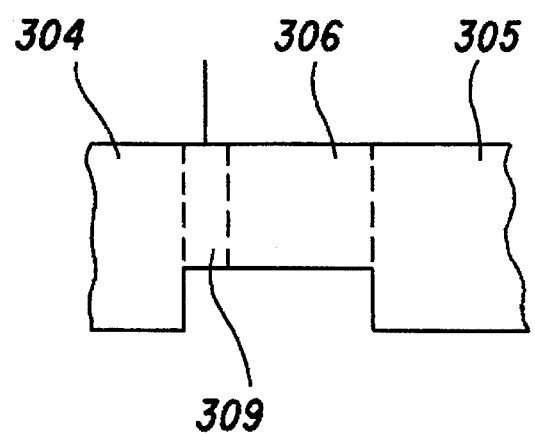
FIG. 24(b) is a view showing a portion in the vicinity of the axially expandable and contractable portion in a case where a force detecting means is used as a preload detecting means.

As the preload detecting means 307, as shown in FIG. 24(a), a displacement detecting means 308 for detecting the axial displacement between the first and second nut portions 304 and 305 is used for detecting the preload from the axial displacement corresponding to the preload, and as shown in FIG. 24(b), a force detecting means 309 for detecting the axial load applied to the axially expandable and contractable portion 306 to detect the preload from the axial load corresponding to the preload.

Figure 25A:
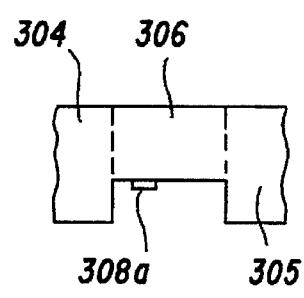
FIGS. 25(a)–(g) are views showing modeled structures of various modes of the displacement detecting means.
Figure 25B:
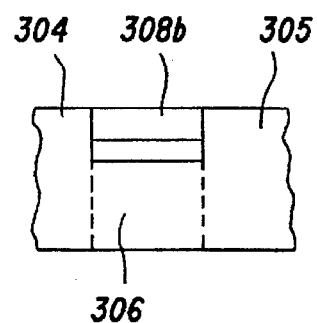
Figure 25C:
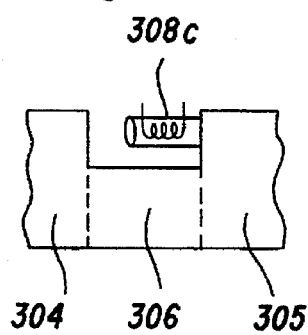
Figure 25D:
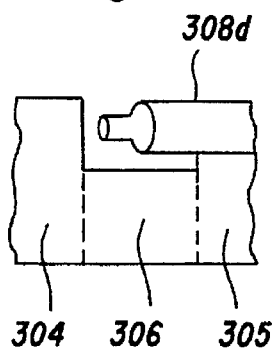
Figure 25E:
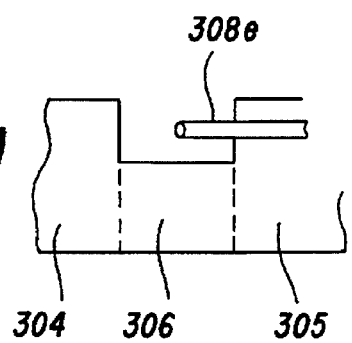

As the displacement detecting means 308, there are utilized various known sensors capable of detecting fine displacement such as a resistance sensor 308a such as strain gauge as shown in FIG. 25(a), a voltage sensor 308b for detecting the displacement as vortage change by utilizing a piezoelectric element or electrostrictive element as shown in FIG. 25(b), an electromagnetic induction sensor 308c such as operation transformer or vortex current sensor as shown in FIG. 25(c), a static capacitance senser 308d as shown in FIG. 25(d), or a light interference sensor 308e utilizing an optical fiber as shown in FIG. 25(e).

Figure 25F:
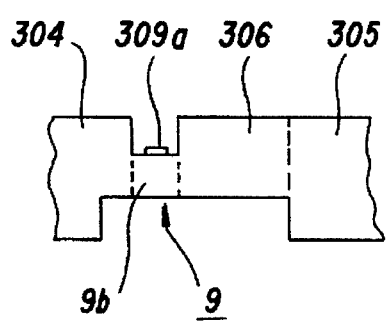

FIGS. 25(f) and (g) represent examples of force detecting means 309. That is, the example of FIG. 25(f) is composed of an elastic member 309b deformable in the axial direction in accordance with the axial load and a strain gauge 309a detecting the strain amount of the elastic member 309b, and the axial load is detected from the detected value of the strain amount of the elastic member 309b.

Figure 25G:
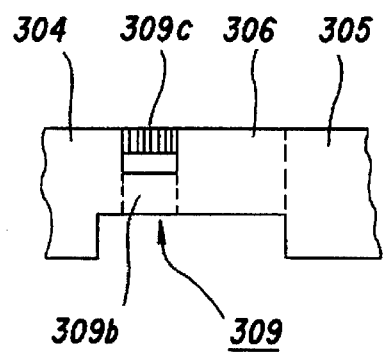

On the other hand, the example of FIG. 25(g) is composed of the elastic member 309b and a piezoelectric element 309c arranged parallely to the elastic member 309b.

It is of course natural to utilize other various detecting means other than the illustrated examples.

Figure 26A:
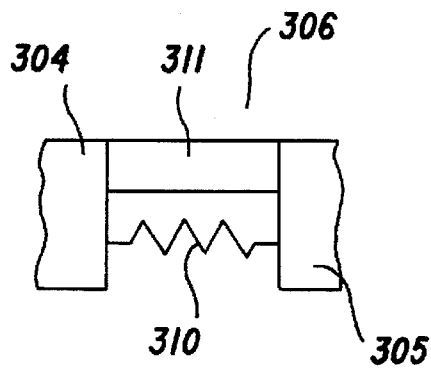
FIG. 26(a) is a view showing a basic structure of the axially expandable and contractable portion of FIGS. 23(a), (b) and (c)

FIGS. 26(a) and (b) represent basic structures of the axially expandable and contractable portion 306, and each structure is provided with an elastic member 310 being elastically deformable in the axial direction and rigid in the rotating direction and a finely displacing means 311 for expanding or contracting the elastic member 310 in the axial direction.

In the example of FIG. 26(a), the elastic member 310 and the finely displacing means 311 are interposed side by side between the first and second nut portions 304 and 305.

Figure 26B:
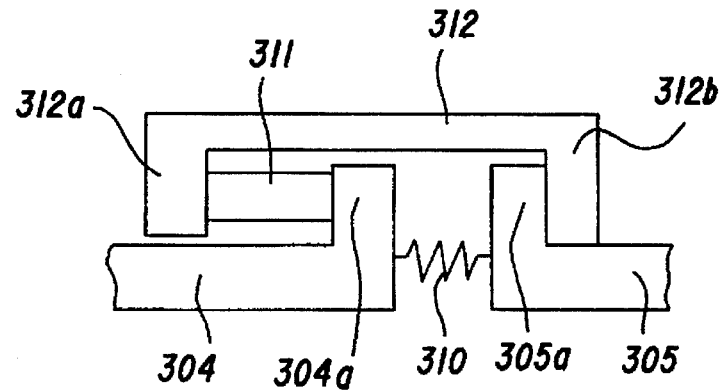
FIG. 26(b) is a view showing a structure of the axially expandable and contractable portion utilizing a seat sleeve.

In the example of FIG. 26(b), only the elastic member 310 is disposed between the opposing faces of the first and second nut portions 304 and 305, and there is utilized a seat sleeve 312 engaging with first and second flange portions 304a and 305a provided for opposing end portions of the first and second nut portions 304 and 305. Namely, the seat sleeve 312 is disposed so as to surround the first and second nut portions 304 and 305 and provided with first and second seat portions 312a and 312b inwardly projecting so as to oppose to the first and second flange portions 304a and 305a of the first and second nut portions 304 and 305. One of the first and second seat portions 312a and 312b, the second seat portion 312b in the illustration, is fixed to the second flange portion 305a, and the finely displacing means 311 is interposed between the first seat portion 312a and the first flange portion 304a. It is of course possible to locate the finely displacing means 311 between the second seat portion 312b and the second flange portion 305a.

Figure 27A:
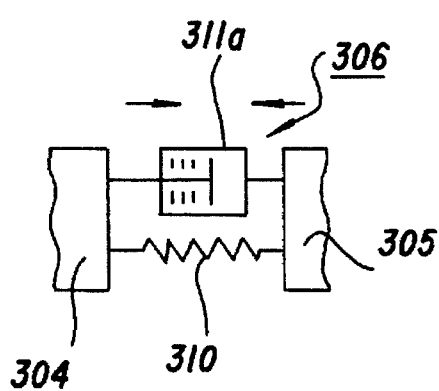
FIGS. 27(a) and (b) are views showing schematic structure in which a fluid pressure cylinder is utilized as the finely displacing means of the axially expandable and contractable portion.
Figure 27B:
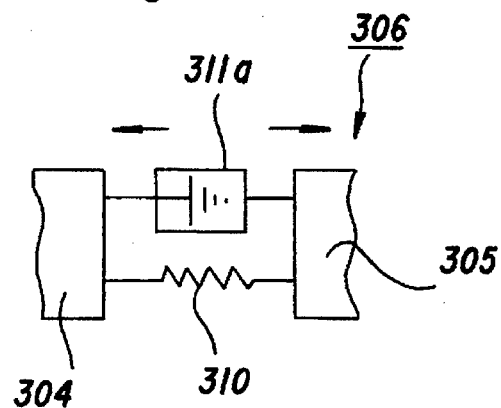

The finely displacing means 311 is a means for performing the expansion or contraction in proportion to a command value when given. For example, there can be utilized as the finely displacing means, other than the piezoelectric element or electrostrictive element, a thermal actuator expanded or contracted by a thermal expansion of an object, an actuator 311a as shown in FIG. 27(a) or (b) expanded or contracted by a fluid pressure, or other actuators utilizing voice coils or magnetostrictive element. That is, various kinds of actuators which are expanded or contracted in proportion to the command value when given may be utilized as the finely displacing means.

Figure 28A:
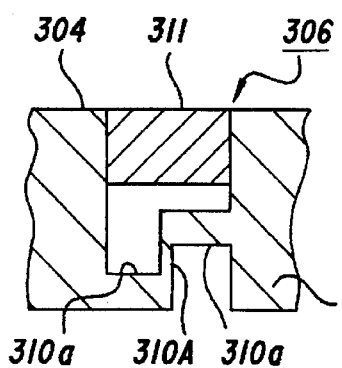
FIGS. 28(a) and (b) are sectional views showing one example of the elastic member.
Figure 28B:
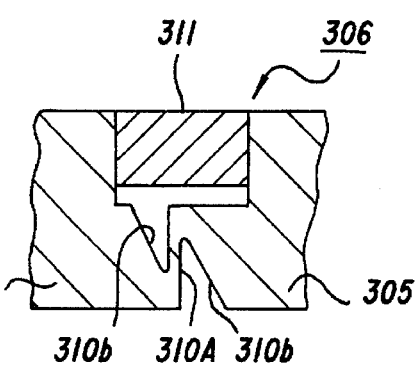
FIGS. 28(c)–(e) are plan views of the elastic member.
FIGS. 28(f)–(h) are views showing various arrangements of the elastic member and the finely displacing member, and FIGS. 28(i) and (j) are sectional views of necessary portion of an alternation of the elastic member.

FIG. 28(a) shows one example of the elastic member, and this elastic member 310A is composed of a plate spring formed of a thin portion of an annular flat plate-like member perpendicular to the axial direction and has a structure being elastically deformable in the axial direction and rigid in the rotating direction thereof. In the illustrated example, the inner and outer peripheral portions of a cylindrical material integral with the first and second nut portions 304 and 305 are cut out to form the thin elastic member 310A, and grooves 310a each rectangular in section are formed at axial both ends of the thin elastic member 310A, but as shown in FIG. 28(b), grooves 310b each triangle in section may be formed at axial both ends of this elastic member 310A..

Figure 28C:
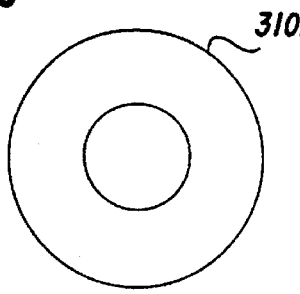
Figure 28D:
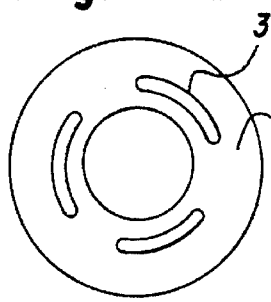
Figure 28E:
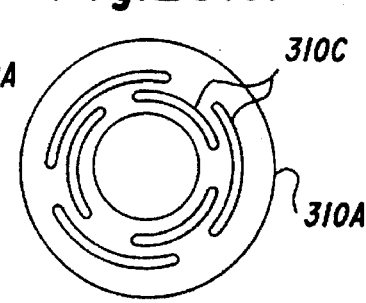

FIGS. 28(c) to (e) are view showing plan shapes of the elastic member 310A, and as shown in FIG. 28(c), the shape may be made to provide an annular flat plate shape, or as shown in FIGS. 28(d) and (e), it may be formed with holes 310c.

Figure 28F:
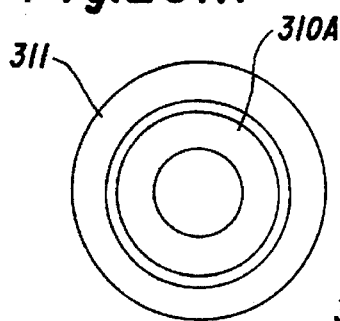
Figure 28G:
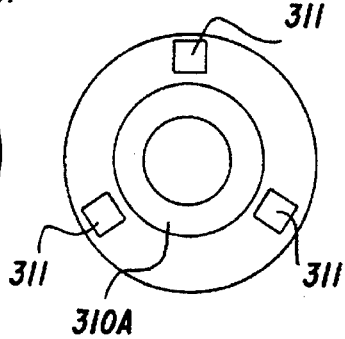
Figure 28H:
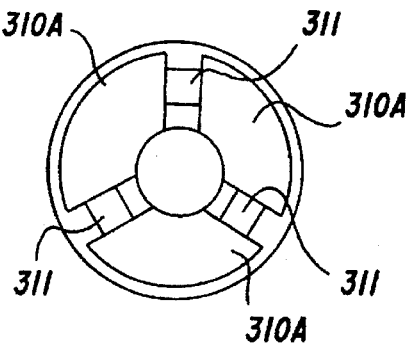

FIGS. 28(f) to (h) shows arrangements of the finely displacing means 311 and the elastic member 310A.

FIG. 28(f) is an example in which the elastic member 310A and the finely displacing means 311 are both formed in ring shapes and arranged coaxially.

FIG. 28(g) is an example in which a bar-like finely displacing means 311 and a ring-shaped elastic member 310A are utilized and three bar-like displacing means 311 are arranged.

FIG. 28(h) is an example in which a bar-like finely displacing means 311 and an elastic member 310B are utilized and the elastic member 310B are circumferentially divided so as to avoid the bar-like finely displacing means 311.

Figure 28I:
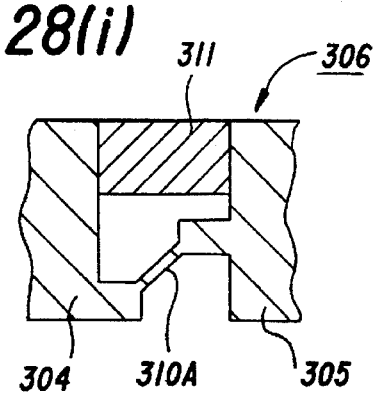
Figure 28J:
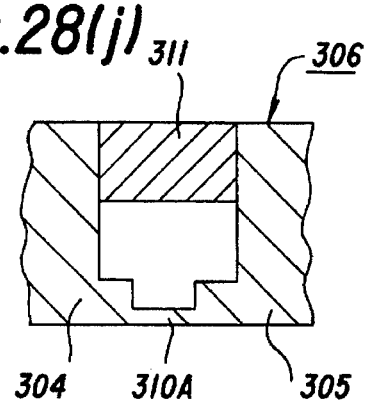

It is not absolutely necessary for the elastic member 310A to have a thin annular flat plate-like shape perpendicular to the axial direction as shown in FIGS. 28(a) and (b), and for example, as shown in FIG. 28(i), the elastic member 310A may have a structure conically inclined with respect to the axial direction or have a structure having a thin axially cylindrical shape. That is, it is only necessary for the elastic member to have a structure elastically deformable in the axial direction and rigid in the circumferential direction.

More concrete embodiments of the feed screw appratus according to this invention will be described hereunder.

The preload variable type screw feed device of this invention includes four types, that is, ① pulling-preload/displacement-detection type, ② compression-preload/displacement-detection type, ③ pulling-preload/force-detection type, and ④ compression-preload/force-detection type. The respective types are explained hereunder.

① [Pulling-preload/displacement-detection type]

Figure 29A:
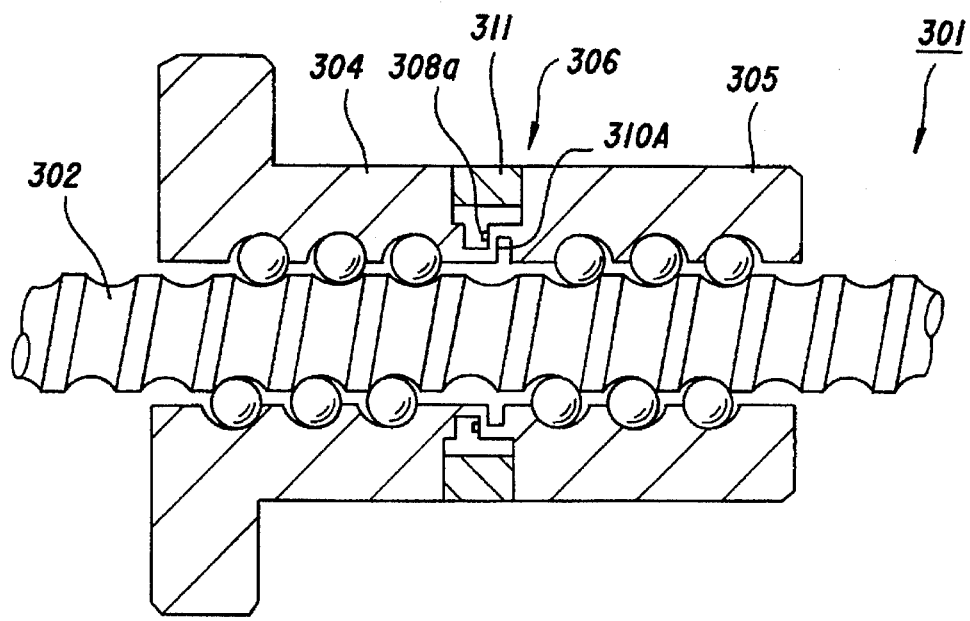
FIG. 29(a) is an elevational section showing one example of a/pulling preload/displacement detection type feed screw apparatus and FIGS. 29(b) and (c) are enlarged sectional views showing a deformed state of the elastic member.
Figure 29B:
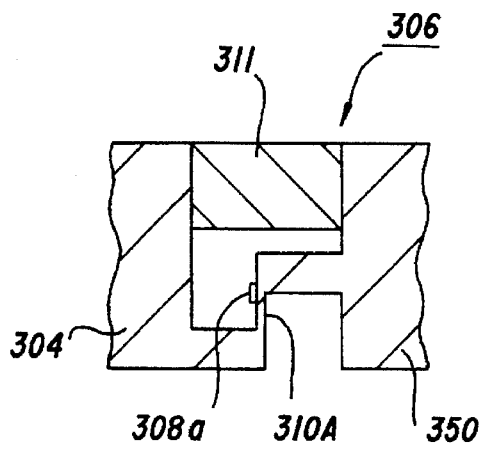
Figure 29C:
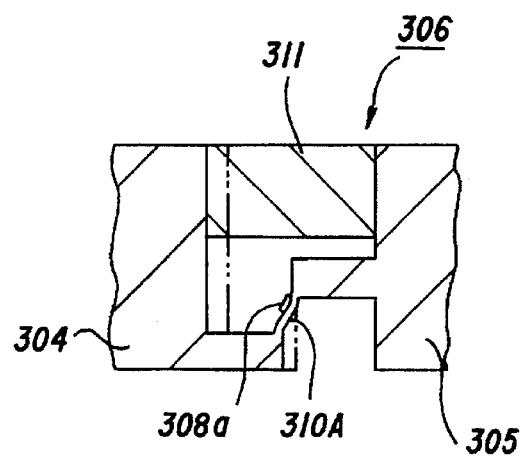

FIG. 29 shows one example of the pulling-preload/displacement-detection type screw feed device, which is basically composed of a screw shaft 302, first and second nut portions 304 and 305 screwed with this screw shaft 302 and an axially expandable and contractable portion 306 interposed between these first and second nut portions 304 and 305.

The axially expandable and contractable portion has the structure shown in FIG. 28(a) and composed of the elastic member 310A and the finely displacing means 311.

A preload applying means is disposed between the first and second nut portions 304 and 305, and in the illustrated example, the resistance sensor such as strain gauge converting the strain amount of the elastic member 310A corresponding to the preload amount into an electric resistance variable and then detecting the same. The resistance sensor 308a is bonded to the elastic member 310A and the strain of the elastic member in accordance with the change of the distance between the first and second nut portions 304 and 305 is detected to thereby detect the preload amount.

The resistance sensor 308a is bonded, as shown in FIGS. 7(a) and (b), in order to improve its response characteristic, to a portion having the most large strain of the elastic member 310A, and in the illustrated example, to a portion in the vicinity of the connected portion of the elastic member 310A.

Figure 30:
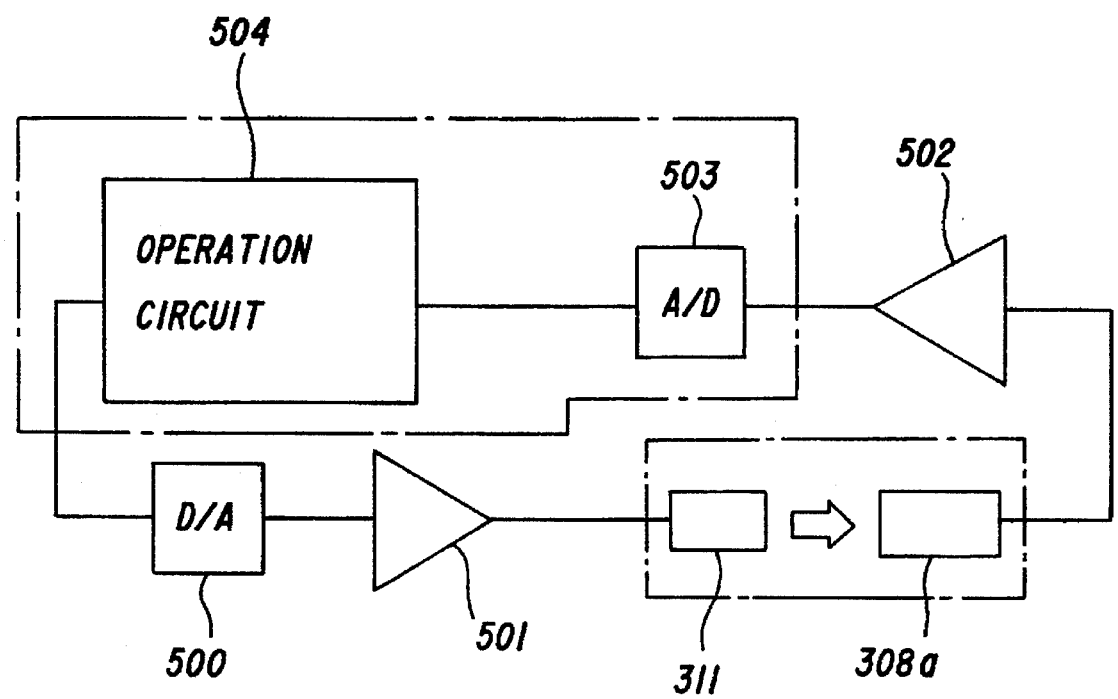

FIG. 30 is a control block of the device of FIG. 29. Namely, the control block comprises a D/A converter 500 converting the command value to an analog signal to operate the finely displacing means 311 such as piezoelectric element, a drive amplifier 501 for amplifying this signal, a strain amplifier for reading the resistance value of the resistance sensor 308a bonded to the elastic member 310A, an A/D converter 503 converting an analog detected value outputted from the strain amplifier 502 into a digital signal, and an operation circuit 504 for processing and controlling the digital signal. The preload condition detected by the resistance sensor 308a is always detected and then fedback to the operation circuit 504, and then the finely displacing means 311 such as piezoelectric element is controlled so as to obtain an appropriate preload condition, thus continuously adjusting the preload.

According to the above procedure, when the rigidity is required, the preload of the screw feed device is applied, and in the contrary case, unnecessary torque is reduced by decreasing the rigidity, whereby the feed screw system can be operated at high speed and positioned with high accuracy, the unnecessary torque is reduced to obtain a long life, and the heat generation can be effectively suppressed.

Furthermore, the minute vibration generated at the positioning time can be avoided by changing the rigidity of the axially expandable and contractable portion 306 and hence changing resonance frequency of the device, thus making short the completion time of the positioning.

Figure 31:
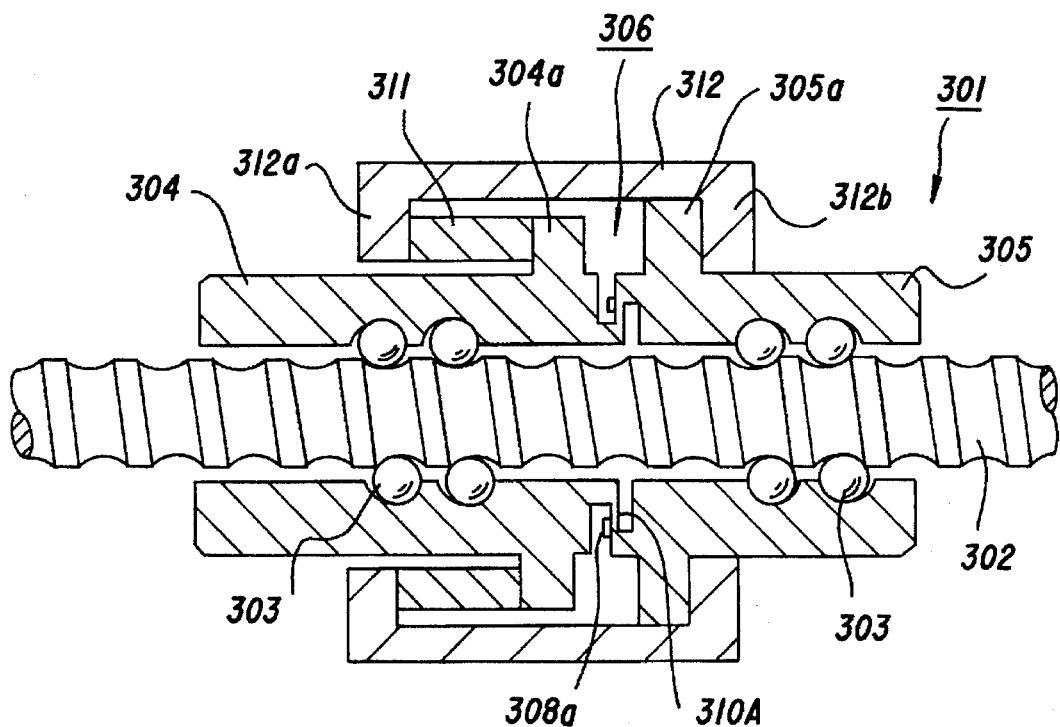
FIG. 31 is an elevational section of an example using the seat sleeve of a pulling preload/displacement detection type feed screw apparatus.

Further, since the first and second nut portions 304 and 305 and the elastic member 310A of the axially expandable and contractable portion 306 are formed integrally, it is not necessary to join the first and second nut portions 304 and 305 with the elastic member 310A. Accordingly, an error caused by the joining and the change in the preload characteristic due to the joined state are not caused and, hence, the characteristic feature as designed can be achieved. Moreover, the shifting of the axes between the first and second nut portions 304 and 305 and the inclinations of the axes of the first and second nut portions 304 and 305 can be also prevented. FIG. 31 shows a second embodiment representing the pulling-preload/displacement-detection type, in which the seat sleeve 312 is utilized for the axially expandable and contractable portion 306 as shown in FIG. 26(b) and the plate spring structure as shown in FIG. 28(a) is adapted for the elastic member 310A, thereby constituting the first and second nut portions 304 and 305 and the elastic member 310A so as to provide an integral structure.

② [Compression-preload/displacement-detection type]

Figure 32:
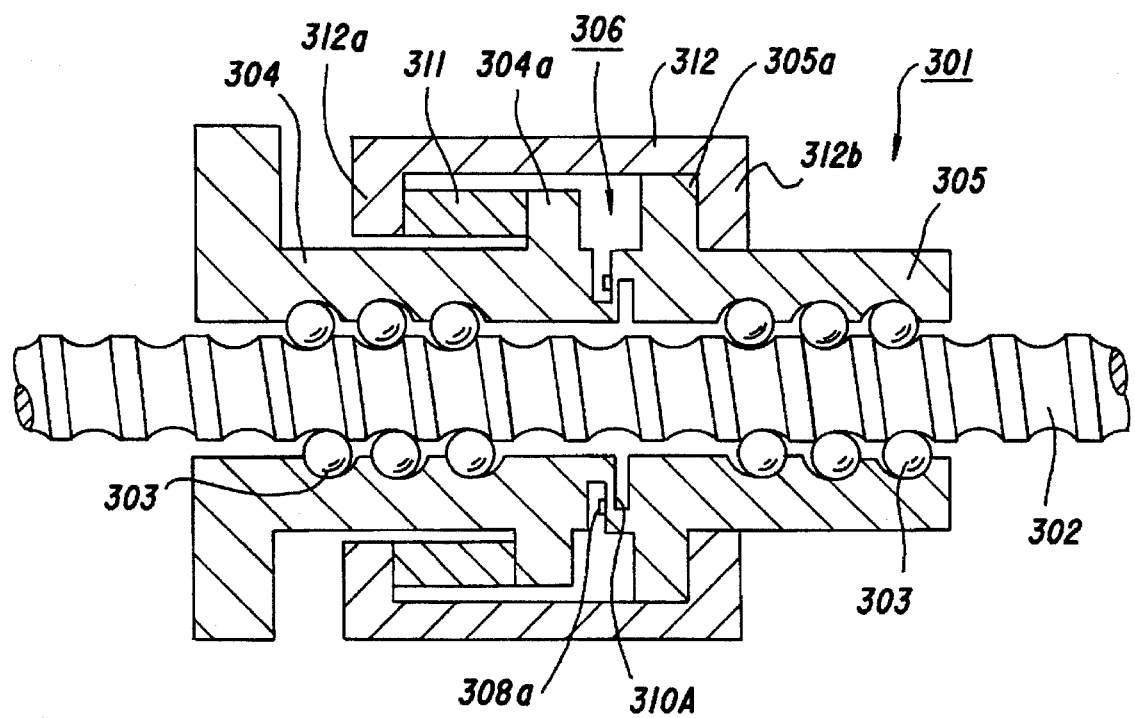
FIG. 32 is an elevational section of an example using the seat sleeve of a compression preload/displacement detection type feed screw apparatus.

FIG. 32 represents a compression-preload/displacement-detection type feed screw system.

This embodiment has a basic structure quitely the same as that of FIG. 31, and in this embodiment, the finely displacing means 311 is expanded by an amount corresponding to the preload amount in the axial direction to thereby displace the first and second nut 304 and 305 to narrow the distance therebetween to apply the preload.

③ [Pulling-preload/force-detection type]

Figure 33A:
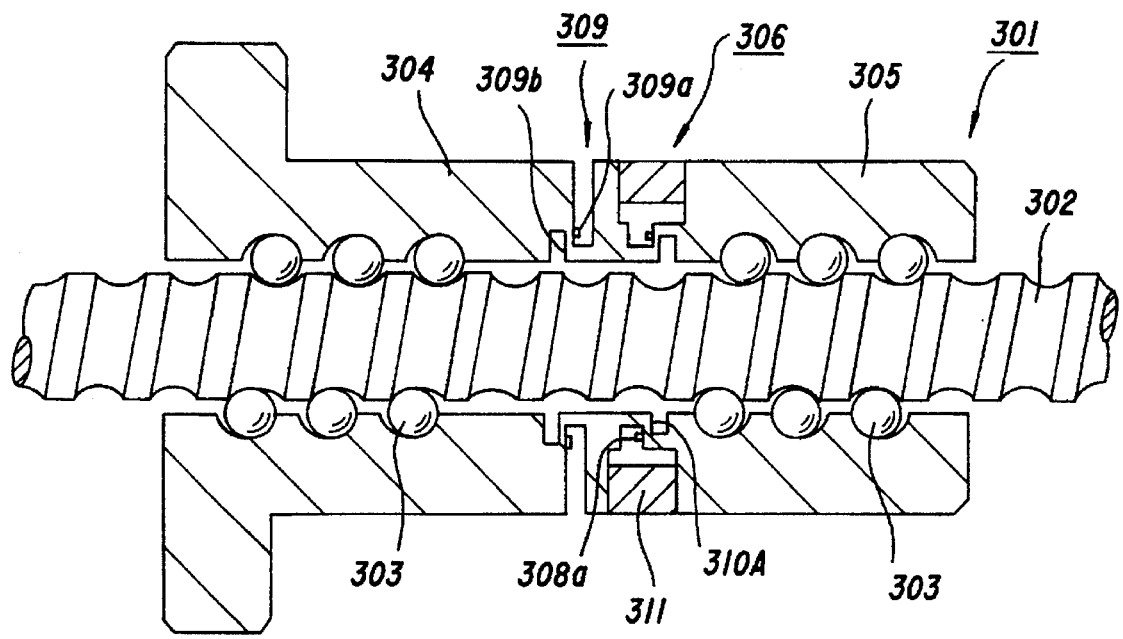
FIG. 33(a) is an elevational section of an example using the seat sleeve of a pulling preload/force detection type feed screw apparatus and FIGS. 33(b) and (c) are enlarged sectional views of an important portion showing the deformed state of the axially expandable and contractable portion and the force detecting means.

FIG. 33(a) represents a detection type feed screw apparatus.

In this embodiment, the force detecting means 309 is arranged in series to the axially expandable and contractable portion 306 to thereby detect the axial load acting on the axially expandable and contractable portion 306.

Figure 33B:
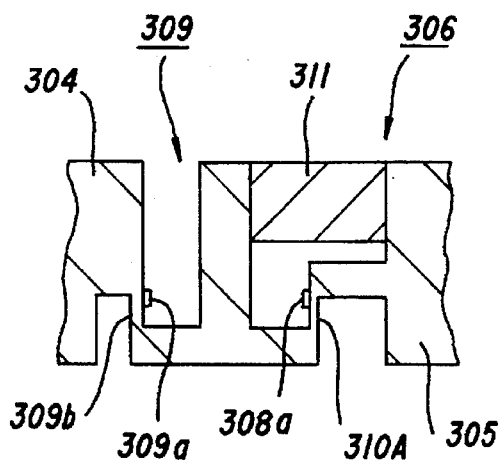

In this embodiment, the strain of the elastic member deformed in accordance with the load as shown in FIG. 25(f) is detected by the resistance sensor 309a as the force detecting means 309. A plate spring having a thin annular flat plate-like structure is utilized as the elastic member 309b similar to the elastic member 310A of the axially expandable and contractable portion 306 elastically deformable in the axial direction and rigid in the rotating direction, and the elastic member 309b has a structure integral with the first and second nut portions 304 and 305 and the axially expandable and contractable portion 306. As shown in FIGS. 33(b) and (c), when the axially expandable and contractable portion 306 is expanded by a predetermined amount, the amount of the preload is increased by an amount corresponding to this expansion amount and the elastic member 309b of the force detecting means 309 is strained in accordance with the increased amount of the preload. The strained amount is detected as the electric resistance change by the resistance sensor 309a.

④ [Compression-preload/force-detection type]

Figure 34:
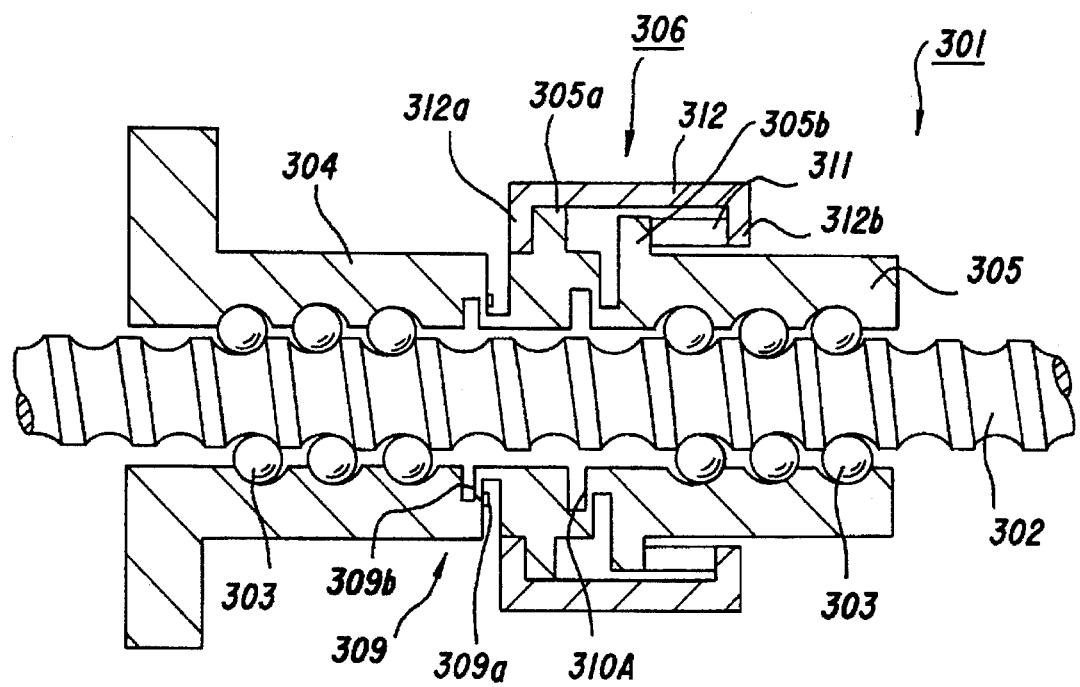
FIG. 34 is an elevational section showing one example of a compression preload/force detection type feed screw apparatus.

FIG. 34 represent a compression-preload/force-detection type feed screw appratus.

This embodiment comprises the axially expandable and contractable portion 306 basically using the seat sleeve 312 and the force detection means 309 arranged in series to this axially expandable and contractable portion 306. The force detection means has a structure quite the same as that of FIG. 33.

The embodiments described above all represent the cases in which the first and second nut portions 304 and 305 and the axially expandable and contractable portion 306 are formed integral, but these portions can be constructed to provide a separate structure without adapting the integral structure.

Figure 35:
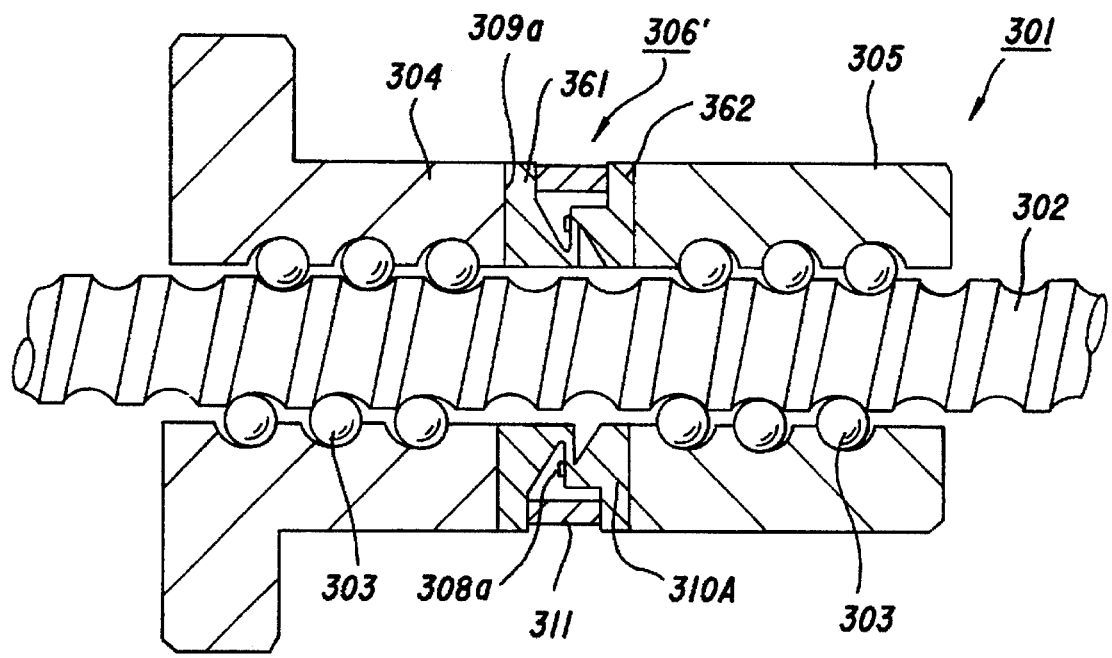
FIG. 35 is an elevational section of a split type pulling preload/displacement detection type feed screw apparatus.
Figure 36:
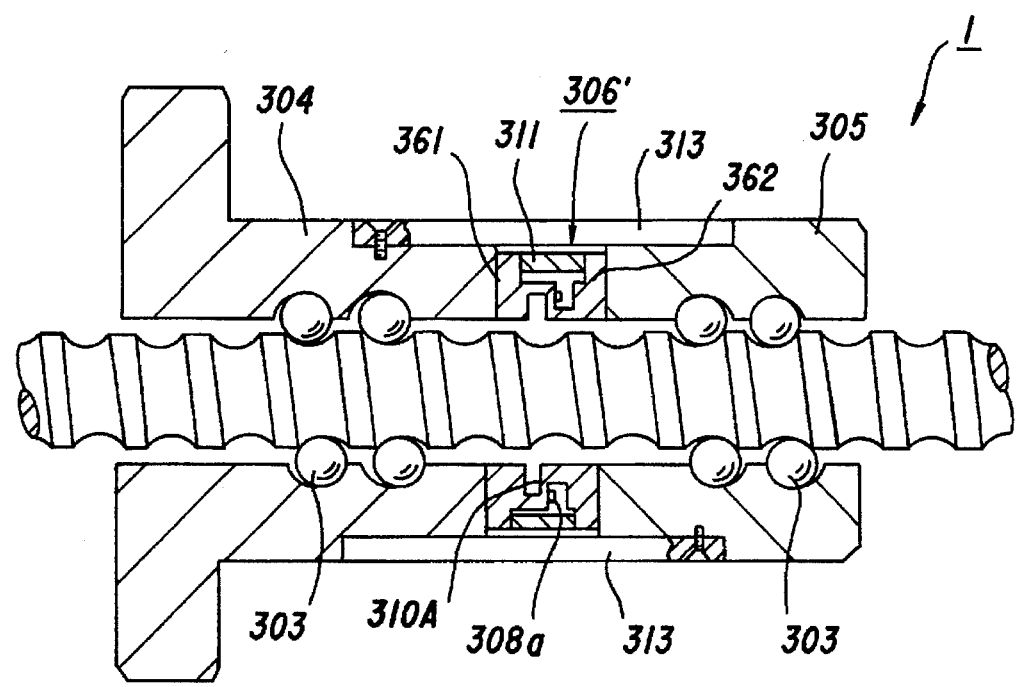
FIG. 36 is a control block of the device of FIG. 29.
Figure 37:
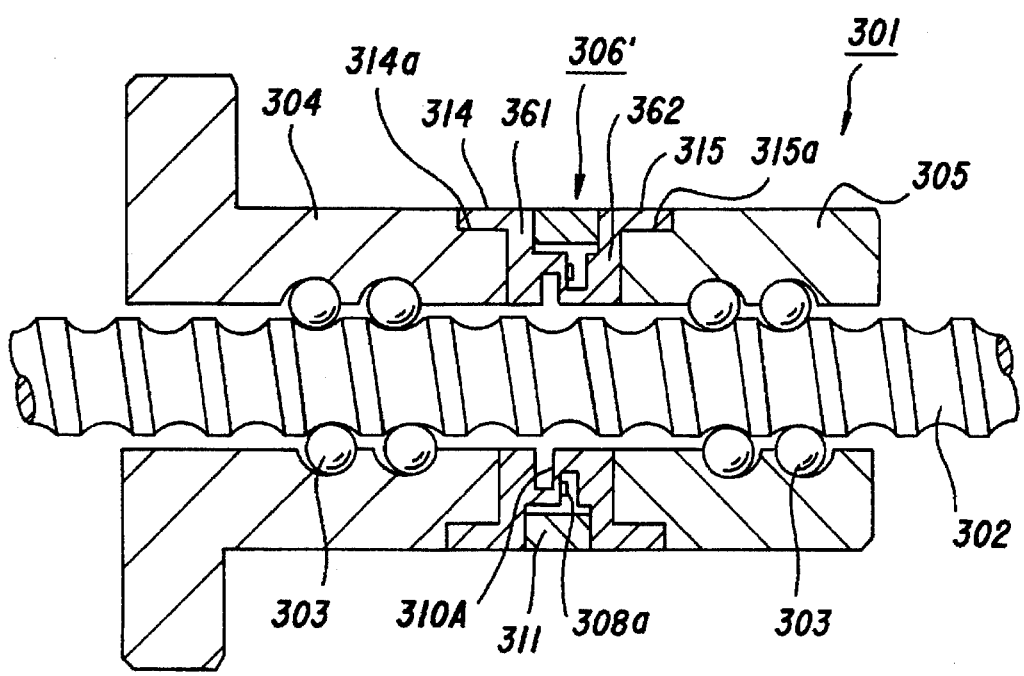
FIG. 37 is an elevational section of a split type pulling preload/displacement detection type feed screw apparatus.

Examples of the separate structure are briefly described hereunder, and the examples of FIGS. 35, 36 and 37 correspond to the split type feed screw device of the [pulling-preload/displacement-detection type].

In each of the examples, an axially expandable and contractable portion 306' is composed of an elastic member 310A and a finely displacing means 311 for expanding and contracting the elastic member 310A in the axial direction. These elastic member 310A and the finely displacing means 311 are arranged between first and second ring portions 361 and 362. The elastic member 310A has a thin annular flat plate-like shape, and an outer end thereof is joined to the second ring portion 362 and an inner end thereof is joined to the first ring portion 361. These first and second ring portions 361 and 362 are joined to the first and second nut portions 304 and 305, respectively.

The example shown in FIG. 35 is one representing the basic structure of the separate structure and the axially expandable and contractable portion 306' is interposed between the first and second nut portions 304 and 305. According to this structure, it is necessary to locate a mechanism for preventing the rotation between the first and second nut portions 304 and 305. In the example of FIG. 36, this mechanism may be composed of a key 313 for preventing the rotation between the first and second nut portions 304 and 305.

In the example of FIG. 37, the first and second ring portions 361 and 362 of the axially expandable and contractable portion 306' are provided with key portions 314 and 315, which are fitted with key grooves 314a and 315a of the first and second nut portions 304 and 305, respectively. In this example, the key portions 314 and 315 are not provided for regulating the rotating direction of the nuts 304 and 305, and the regulation of the rotating direction is done in accordance with the circumferential rigidity of the elastic member 310A. The relative movement in the axial direction is also done in accordance with the elastic deformation in the axial direction of the elastic member 310A.

Figure 38:
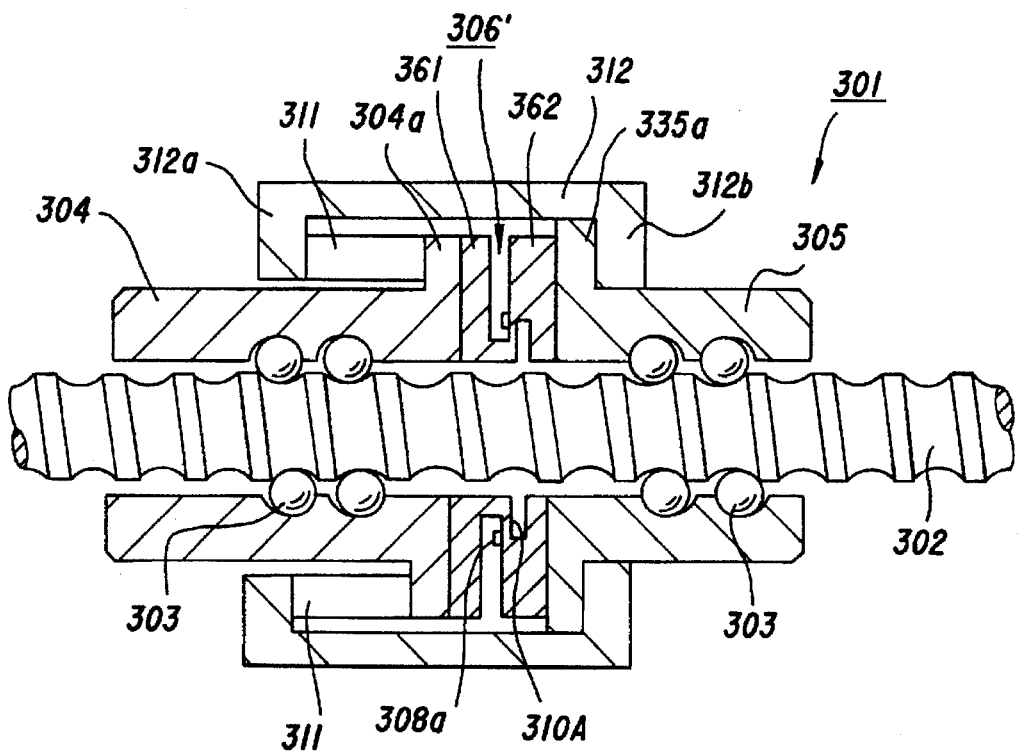
FIG. 38 is an elevational section of a split type pulling preload/force detection type feed screw apparatus.

Next, an example shown in FIG. 38 is one of a separate structure utilizing the seat sleeve 312 corresponding to the [pulling-preload/displacement-detection type] feed screw apparatus of FIG. 31. Namely, the axially expandable and contractable portion 306' is formed so as to provide the separate structure and is interposed between the flange portions 304a and 305a of the first and second nut portions 304 and 305.

Figure 33C:
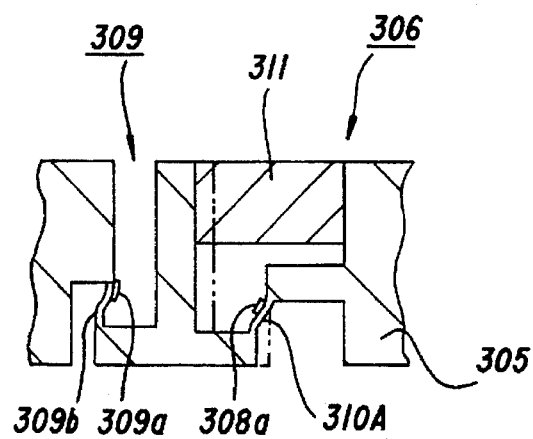
Figure 39:
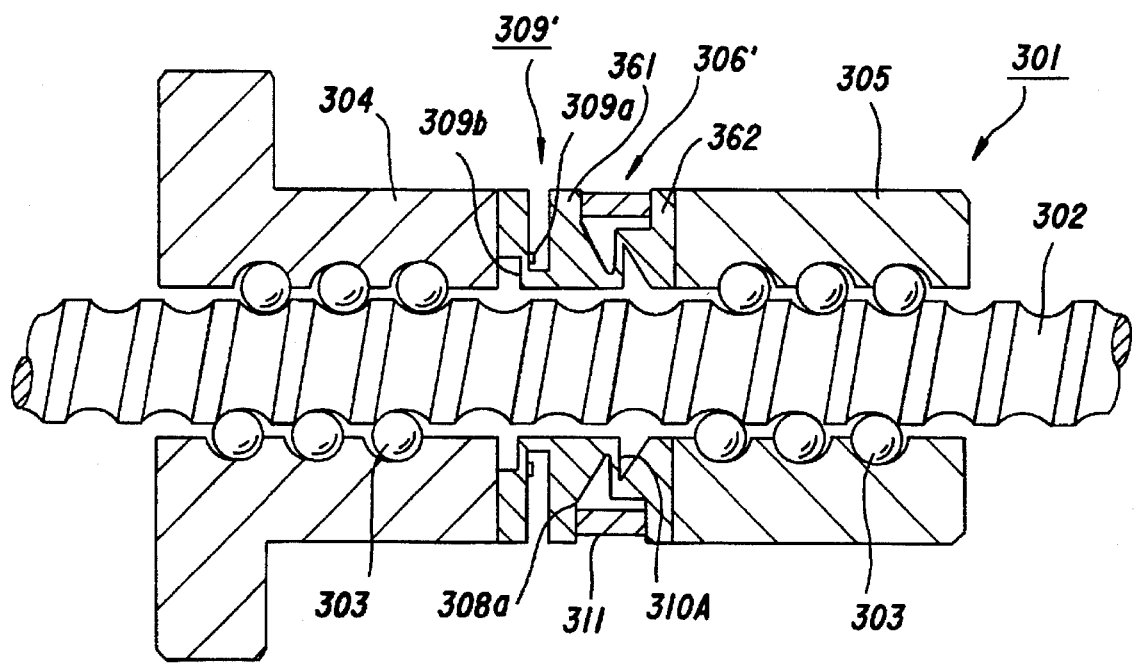
FIG. 39 is an elevational section of a split type compression preload/force detection type feed screw apparatus.
Figure 40A:
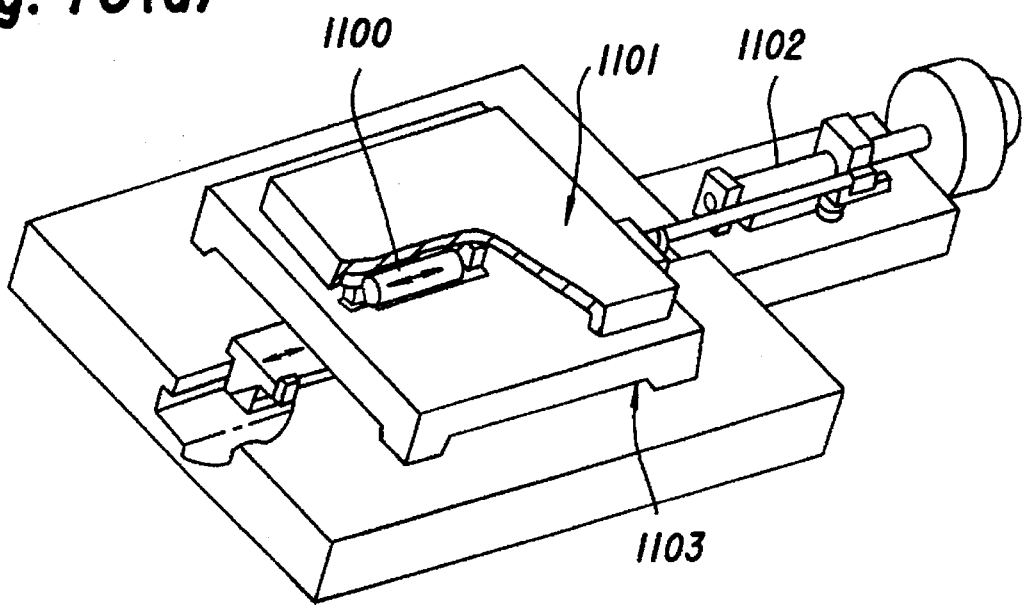
FIG. 40(a) is a schematic perspective view of a conventional feed apparatus and FIG. 40(b) is a schematic sectional view of an inch-worm mechanism of the device of FIG. 40(a).
Figure 40B:
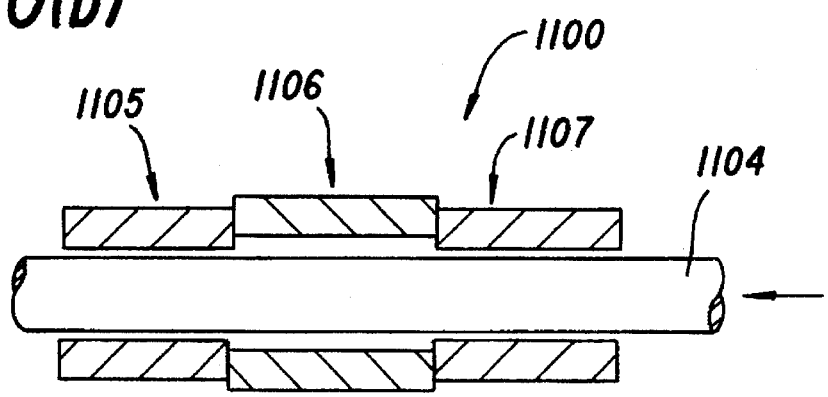

An example shown in FIG. 39 is one of a separate structure corresponding to the [compression-preload/force-detection type] feed screw apparatus of FIG. 33.

Namely, the axially expandable and contractable portion 306' and a force detection means 309' are formed as an integral structure and interposed between the first and second nut portions 304 and 305.

Further, in the examples of FIGS. 33 and 39, the axially expandable portion and the force detection means 309 are arranged in series, and by deforming the axially expandable and contractable portion 306 in accordance with the deformation amount of the force detection means 309, the displacement amount can be made zero and it can be utilized as a sensor for detecting the force without making displacement at all.

Furthermore, in this example, there is provided a structure for applying the preload to the nut, but, by providing an axially expandable and contractable portion to the feed screw shaft (not shown), the preload can be applied to a rolling member of a roller bearing of a fixed member supporting the feed screw shaft. Particularly, it is effective to a case where the feed screw shaft is rotated at most two times.

As described hereinbefore, in this invention, since the axially expandable and contractable portion between the nut portions is constructed to be expandable and contractable, the preload can be adjusted to a desired value without utilizing any washer member as in the conventional system.

Furthermore, according to the combined structure of the axially expandable and contractable portion and the finely displacing means and the structure of the elastic member expandable and contractable in the axial direction and rigid in the rotating direction, the axially expandable and contractable portion can be utilized as the rotation preventing mechanism between the nut portions, which eliminates the rotation preventing mechanism such as key having a large friction resistance in the prior art, whereby so-called the insensitiveness zone due to the friction is not present and the response characteristic at the preload adjustment can be remakably improved. Still furthermore, according to the integral structure of the axially expandable and contractable portion and the nut portions, the error in the joining of the axially expandable and contractable portion and the nut portions and the change due to the joined condition do not occur, thereby obtaining the characteristics as designed.

In the meantime, it is possible to locate the preload detecting means to directly detect the preload, and it is possible to precisely control the preload condition by adjusting the preload through the expansion and contraction of the axially expandable and contractable portion.

Possiblility in Industrial Usage

As described hereinbefore, the feed screw appratus and precisely positioning and fine feed system according to this invention is effective as feed system for such as machine tool, robot, measuring device and the like.

The invention claimed is:

1. A feed screw apparatus, comprising:
   a fixed member;
   a feed screw shaft supported by the fixed member and being rotatable;
   a nut mounted to the feed screw shaft;
   a movable member attached to the nut, wherein a force is transferred to the movable member from the fixed member through the feed screw shaft and the nut;
   an elastic member elastically deformable in an axial direction provided at a portion through which the force is transferred; and
   a force detecting means for detecting the force through detection of an amount of elastic deformation of the elastic member.

2. A feed screw apparatus according to claim 1, wherein the elastic member is elastically deformable in the axial direction and rigid in a rotating direction and in a direction perpendicular to the feed screw shaft.

3. A feed screw appratus according to claim 1, wherein the elastic member is formed with a thin thickness portion elastically deformable in the axial direction.

4. A feed screw apparatus according to claim 1, wherein the elastic member is formed integrally with at least a portion of one of said fixed member, said feed screw, said nut and said movable number, through which the force of the feed screw apparatus is transferred to provide an elastically deformable portion in the axial direction.

5. A feed screw apparatus according to claim 1, wherein the elastic member is formed as an independent structure from the structure through which the force of the feed screw appratus is transferred and joined thereto.

6. A feed screw apparatus according to claim 1, wherein the elastic member is provided for the fixed member.

7. A feed screw apparatus according to claim 1, wherein the elastic member is provided for the feed screw shaft.

8. A feed screw apparatus according to claim 1, wherein the elastic member is provided for the nut.

9. A feed screw apparatus according to claim 1, wherein the elastic member is provided between the movable member and the nut.

10. A feed screw apparatus according to claim 1, wherein the force detecting means includes the elastic member and a displacement or strain detecting means for converting a displacement or strain variable in accordance with an axial load of the elastic member into an electric signal and detecting the signal.

11. A feed screw apparatus according to claim 1, wherein the force detecting means is disposed between the nut and the movable member.

12. A feed screw apparatus according to claim 1, wherein the force detecting means is provided for the feed screw shaft.

13. A feed screw apparatus according to claim 1, wherein the elastic member is elastically deformable in the axial direction and rigid in a rotating direction and in a direction perpendicular to the feed screw shaft.

14. A feed screw apparatus according to claim 1, wherein the elastic member is formed with a thin thickness portion elastically deformable in the axial direction.

15. A feed screw apparatus according to claim 14, wherein a strain gauge is bonded to the thin thickness portion.

16. A feed screw apparatus, comprising:
   a fixed member;

a feed screw shaft supported by the fixed member to be rotatable;

a nut mounted to the feed screw shaft;

a movable member attached to the nut, wherein a force is transferred to the movable member from the fixed member through the feed screw shaft and the nut;

an elastic member elastically deformable in an axial direction provided at a portion through which the force is transferred;

a displacement generating means arranged in parallel with the elastic member to form an axially expandable and contractible portion for deforming the elastic member axially; and a displacement detecting means for detecting a fine displacing amount of the axially expandable and contractible portion.

17. A feed screw apparatus according to claim 16, wherein the axially expandable and contractable portion is arranged between the nut and the movable member so as to adjust the position of the member.

18. A feed screw apparatus according to claim 16, wherein the axially expandable and contractable portion is provided for the fixed member so as to adjust a position of the entire structure of the feed screw shaft.

19. A feed screw apparatus according to claim 16, wherein a rough feed of the movable member is performed by the feed screw shaft and a fine feed thereof is performed by the axially expandable and contractable portion.

20. A feed screw apparatus according to claim 16, wherein the amount of the displacement generation of the displacement generating means of the axially expandable and contractable portion is controlled in accordance with a detected value of the displacement detecting means.

21. A feed screw apparatus according to claim 16, wherein in the displacement generation means is a means for carrying out displacement in the axial direction in proportion to a command value when given.

22. A feed screw apparatus according to claim 16, wherein the axially expandable and contractable portion is disposed between two nut portions so as to be capable of adjusting a preload.

23. A feed screw apparatus according to claim 16, wherein a preload detecting means is disposed for detecting an axial preload applied to a portion between the nut portion and the feed screw shaft.

24. A feed screw apparatus according to claim 23, wherein the displacement generating means is a means for carrying out axial displacement in accordance with the command value.

25. A feed screw apparatus according to claim 23, wherein the preload is detected in accordance with the preload detecting means from an axial load applied to the axially expandable and contractable portion.

26. A feed screw apparatus according to claim 23, wherein an amount of expansion or contraction of the axially expandable and contractable portion is controlled in accordance with the detected value of the preload detecting means to thereby adjust the preload.

27. A feed screw apparatus according to claim 23, wherein the preload detecting means is fixed to an axial portion between the nut portions to detect the preload in accordance with a strain based on the change of a gap between the nut portions.

28. A feed screw apparatus according to claim 16, wherein the axially expandable and contractable portion is provided for the feed screw shaft so as to be capable of adjusting a support rigidity of the fixed member.

29. A feed screw apparatus according to claim 28, wherein the fixed member rotatably supports the feed screw shaft through roller bearing capable of adjusting the preload of a rolling member of the roller bearing.

30. A feed screw apparatus according to claim 29, wherein a dynamic rigidity of an entire feed screw device is adjusted by adjusting the preload of the rolling member.

31. A feed screw apparatus according to claim 16, wherein the axially expandable and contractable portion and the force detecting means are arranged in series.

32. A feed screw apparatus according to claims 21, 22 or 16, wherein the displacement generating means is composed of a piezoelectric element or electostrictive element.

33. A feed screw apparatus according to any one of claims 21, 22 or 16, wherein the displacement generating means is an actuator expandable and contractable by utilizing a fluid pressure.

34. A feed screw apparatus according to any one of claims 21, 22 or 16, wherein the displacement generating means is an actuator expandable and contractable by utilizing a thermal expansion.

35. A feed screw apparatus according to claims 21, 22 or 16, wherein the displacement generating means is an actuator utilizing a voice coil.

36. A feed screw apparatus according to claims 21, 22 or 16, wherein the displacement generating means is an actuator utilizing a magnetostrictive element.

37. A precise positioning and fine feed system, comprising:

a fixed member;

a feed screw shaft rotatably supported by the fixed member;

a nut mounted to the feed screw shaft;

a movable member attached to the nut;

an axially expandable and contractible portion disposed between the movable member and the nut and provided with an axially expandable displacement generating means;

a rotation driving means for roughly moving the nut by a predetermined stroke with respect to the feed screw shaft by rotating the feed screw shaft by a predetermined amount in response to a predetermined rough feed control target signal;

a fine feed amount detecting means for detecting fine feed amount by means of the axially expandable and contractible portion; and a command device for imparting a fine feed control target signal to a fine displacing means of the axially expandable and contractible portion in response to an output from the fine feed amount detecting means and the predetermined fine feed control target signal.

38. A precise positioning and fine feed system according to claim 37, further comprising a rough feed amount detecting means for detecting a rough feed amount of the nut with respect to the feed screw shaft and a rough feed control device for controlling the rotation driving means in response to an output of the rough feed amount detecting means and to a predetermined rough feed control target signal.

39. A precise positioning and fine feed system according to claim 37, wherein a converter for converting the fine feed control target signal outputted from the command device to the fine feed control device from a digital signal to an analog signal, a control of the rotation driving means is performed by the digital signal and the control of the axially expandable and contractable portion is performed by the analog signal.

40. A precise positioning and fine feed system, comprising:

a fixed member;

a feed screw shaft rotatably supported by the fixed member;

a nut mounted to the feed screw shaft;

a movable member attached to the nut;

an axially expandable and contractible portion disposed between the movable member and the nut and provided with an axially expandable elastic member and a fine displacement generating means disposed in parallel with the elastic member;

a rotation driving means for roughly moving the nut by a predetermined stroke with respect to the feed screw shaft by rotating the feed screw shaft by a predetermined amount in response to a predetermined rough feed control target signal;

a fine feed amount detecting means for detecting fine displacement of the axially expandable and contractible portion; and a command device for imparting a fine feed control target signal to the fine displacement generating means of the axially expandable and contractible portion in response to an output from the fine feed amount detecting means and the predetermined fine feed control target signal.

41. A precise positioning and fine feed system, comprising:

a fixed member;

a feed screw shaft rotatably supported by the fixed member;

a nut mounted to the feed screw shaft;

a movable member attached to the nut;

an axially expandable and contractible portion disposed between the movable member and the nut and provided with an axially expandable elastic member and a fine displacement generating means disposed in parallel with the elastic member;

a rotation driving means for roughly moving the nut by a predetermined stroke with respect to the feed screw shaft by rotating the feed screw shaft by a predetermined amount in response to a predetermined rough feed control target signal;

a fine feed amount detecting means for detecting fine displacement of the axially expandable and contractible portion;

a command imparting device for transmitting the rough feed control target signal to the rotation driving means and a fine feed control target signal to the displacement generating means; and a fine feed control device for controlling the fine displacement generating means in response to an output of the fine feed amount detecting means and predetermined fine control target signal.

* * * * *